(12) United States Patent
Takahashi et al.

(10) Patent No.: US 8,417,960 B2
(45) Date of Patent: Apr. 9, 2013

(54) METHOD FOR GENERATING AN ENCRYPTION KEY USING BIOMETRICS AUTHENTICATION AND RESTORING THE ENCRYPTION KEY AND PERSONAL AUTHENTICATION SYSTEM

(75) Inventors: Kenta Takahashi, Kawasaki (JP); Masahiro Mimura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1487 days.

(21) Appl. No.: 11/515,940

(22) Filed: Sep. 6, 2006

(65) Prior Publication Data

US 2008/0072063 A1 Mar. 20, 2008

(51) Int. Cl.
*H04L 29/06* (2006.01)

(52) U.S. Cl. .......... 713/186; 380/44; 382/115; 382/124; 382/125; 340/5.82

(58) Field of Classification Search .................... 380/44, 380/259, 30, 47; 713/155, 171, 172, 186; 726/9, 19, 20, 21, 5, 6, 7, 18; 382/115, 116, 382/124, 125
See application file for complete search history.

(56) References Cited

U.S. PATENT DOCUMENTS

| | | | |
|---|---|---|---|
| 6,185,316 B1 * | 2/2001 | Buffam | 382/115 |
| 6,363,485 B1 * | 3/2002 | Adams et al. | 713/186 |
| 7,433,501 B2 * | 10/2008 | Naccache et al. | 382/124 |
| 7,596,245 B2 * | 9/2009 | Kaleedhass | 382/115 |
| 7,895,440 B2 * | 2/2011 | Cardonnel et al. | 713/176 |
| 2002/0120592 A1 * | 8/2002 | Juels et al. | 706/8 |
| 2002/0150283 A1 * | 10/2002 | Mimura et al. | 382/124 |
| 2004/0111625 A1 * | 6/2004 | Duffy et al. | 713/186 |
| 2005/0135661 A1 * | 6/2005 | Mimura et al. | 382/124 |
| 2005/0229009 A1 * | 10/2005 | Fujii et al. | 713/186 |

FOREIGN PATENT DOCUMENTS

JP 2002-217889 8/2002

OTHER PUBLICATIONS

Yongwha Chung et al., "Automatic Alignment of Fingerprint Features for Fuzzy Fingerprint Vault", 2005, Information Security and Cryptology, pp. 358-369.*
Yukio Itakura, and Shigeo Tsujii, "Proposal on a multifactor biometric authentication method based on cryptosystem keys containing biometric signatures", Mar. 8, 2005, Int J Inf Secur (2005) 4: 288-296, Springer-Verlag.*
Uludag et al., "Fuzzy Vault for Fingerprints", 2005, Lecture Notes in Computer Science, NUMB 3546, pp. 310-319.*
Juels, A.; Sudan, M., "A fuzzy vault scheme," Information Theory, 2002. Proceedings. 2002 IEEE International Symposium on , vol., No., pp. 408-, 2002.*
Kikuchi et al., Evaluation and Implement of Fuzzy Vault Scheme using Indexed Minutiae, SMC 2007: 3709-3712.*
T. Charles Clancy, et al., "Secure Smarcard-Based Fingerprint Authentication", Proc. ACM SIGMM Multimedia, Biometrics Methods and Workshop, 2003.
Y. Dodis, L. Reyzin, and A. Amith, "Fuzzy Extractors: How to Generate Strong Keys from Biometrics and Other Noisy Data", Proc. Advances in Cryptology—EuroCrypt, 2004.
Jain and S. Pankanti, "Automated Fingerprint Identification and Imaging Systems", in Advances in Fingerprint Technology, 2nd Ed., H.C. Lee and R.E. Gaensslen, Eds., Elsevier Science, New York, 2001.

* cited by examiner

*Primary Examiner* — Eleni Shiferaw
*Assistant Examiner* — Hilary Branske
(74) *Attorney, Agent, or Firm* — Antonelli, Terry, Stout & Kraus, LLP.

(57) ABSTRACT

A personal authentication system using biometrics information. The system orders, when an characteristic element in the biometrics information (such as a characteristic point in a fingerprint) can be expressed with two types of information (such as, for instance, a coordinate values for a characteristic point in a fingerprint and a local partial image), the characteristic points using one type of information (for instance, local partial image) as label information, and outputs other type of information (such as coordinate values) as key information according to the order.

9 Claims, 17 Drawing Sheets

FIG. 17
RELATION RADIATION
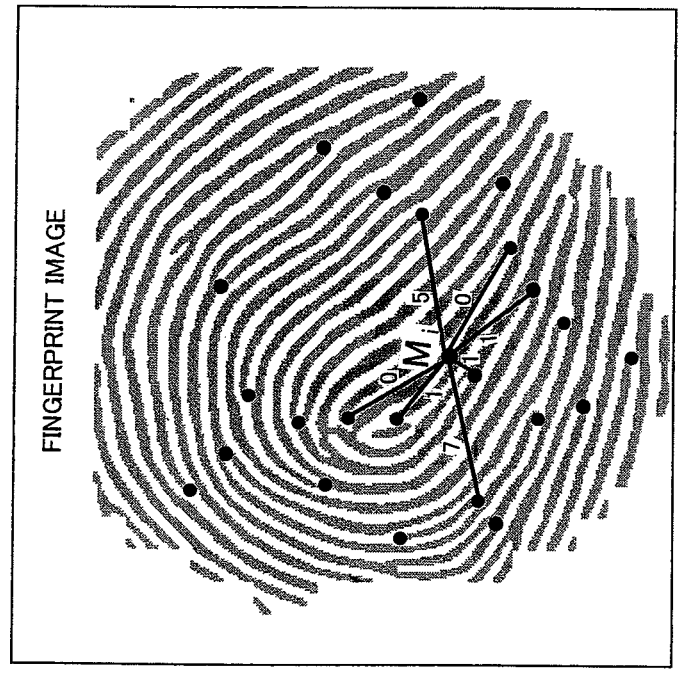
FINGERPRINT IMAGE
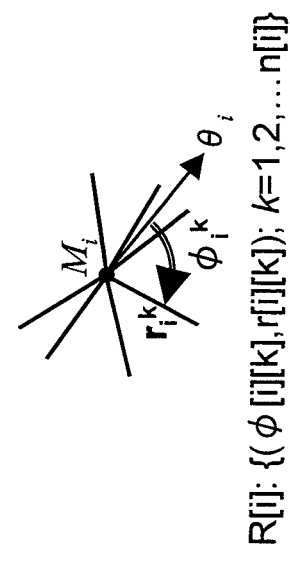
FINGERPRINT LABEL INFORMATION
$R[i]: \{(\phi[i][k], r[i][k]); k=1,2,\ldots,n[i]\}$

METHOD FOR GENERATING AN ENCRYPTION KEY USING BIOMETRICS AUTHENTICATION AND RESTORING THE ENCRYPTION KEY AND PERSONAL AUTHENTICATION SYSTEM

BACKGROUND OF THE INVENTION

The present invention relates to a method for generating an encryption key using biometrics authentication and restoring the encryption key as well as to a personal authentication system using the method. More specifically, the present invention relates to a method for providing personal authentication by registering an encryption key for personal authentication with features of a finger print and a personal authentication system based on generation of an encryption key using biometrics information and the biometric information enabling both stable generation of an encryption key and high security against attackers.

In a user authentication system using biometrics information, biometrics information is acquired from a user, data generally referred to amounts of characteristic is extracted from the information and registered when a user makes a registration in the system. This registered information is referred to as template. When the user is to be authenticated, again biometrics information is acquired from the user, an amount of characteristic is extracted from the information, and amounts of characteristic is compared with the template to determine whether the user has been registered in the system. When a user at a client side is to be authenticated based on biometric information by a server via a network, typically the server stores the template. The client acquires biometrics information from the user when the user is to be authenticated, extracts amounts of characteristic and sends the amounts of characteristics to the server, while the server compares the amounts of characteristic to the temperature which determines whether the user has been registered in the system.

Because the template is used to identify each user, strict management is required in terms of personal information, and therefore the management cost is very high. Even when the template is put under strict management, many users are apt to have psychological resistance against registration of a template from a view point of protection of privacy. Furthermore, one type of biometrics information acquired from a user is limited in the number (for instance, finger prints acquired from one user is 10). When a template is leaked and there is the possibility of falsification, the template cannot easily be changed like an encryption key, and if the same biometrics information is registered in different systems, the security in other systems may be lost. As described above, in personal authentication using biometrics information, there always exist the problems relating to privacy and security.

To solve the problems as described above, there is the approach based on a combination of authentication utilizing the encryption technique such PKI (Public Key Infrastructure) and as that using biometrics information. In this approach, a template and a secret key are stored in a tamper-proof device carried by a user such as an IC card, the biometrics information acquired from the user when the user is registered in the system is compared with template in the tamper-proof device, and when a result of verification is successful, the secret key is activated and the server authenticates the tamper-proof device by means of the challenge and response. In this method, however, each user is required to carry a tamper-proof device having the verifying function or the PKI function such as an IC card, and there is the problem that the system cost increases for the number of users.

To address this problem, there has been proposed the approach in which a secret key is directly generated from biometrics information. In this approach, it is not necessary to store a template or a secret key, nor is required an expensive tamper-proof device, yet the requirements for privacy and security are satisfied. More specifically, auxiliary information based on biometrics information of and a secret key for each user is prepared and recorded when the user is registered in the system, the secret key is restored from the biometrics information newly acquired from the user and the auxiliary information when the user is to be authenticated, and the server authenticates the client, for instance, by means of challenge and response. In this approach, the original information or a secrete key cannot be guessed from the auxiliary information, and therefore it is not necessary to store biometrics information or a secret key in a tamper-proof device, which makes it possible to associate authentication using biometrics information with the encryption technique.

CITED REFERENCE LIST

Japanese Patent laid-Open No. 2002-217889
T. Charles Clancy, et al. "Secure Smartcard-Based Fingerprint Authentication", Proc. ACM SIGMM Multimedia, Biometrics Methods and Workshop, pp. 45-52, 2003
Y. Dodis, L. Reyzin, and A. Amith, "Fuzzy Extractors: How to Generate Strong Keys from Biometrics and Other Noisy Data", Proc. Advances in Cryptology—EuroCrypt, 2004
A. Jain and S. Pankanti, "Automated Fingerprint Identification and Imaging Systems," in Advances in Fingerprint Technology, 2nd Ed., H. C. Lee and R. E. Gaensslen, Eds., Elsevier Science, New York, 2001

Method for generating a secret key from biometrics information by making use of the auxiliary information as described above include the techniques disclosed in Japanese patent Laid-Open No. 2002-217889 and in T. Charles Clancy, et al. "Secure Smartcard-based Fingerprint Authentication".

In the technique disclosed in Japanese patent lad-Open No. 2002-217889, a template is encrypted by using a secret key when a user is registered in a system, and the encrypted template is stored as the auxiliary information. When the user is to be authenticated, the auxiliary information is decoded sequentially for all of candidate keys, the decoded data is compared with biometrics information newly acquired from the user, and when a result of the comparison is successful, it is determined that the secret key is correct. In this method, comparison must be performed $2^n$ times for a bit length n of a key to be searched for authentication. Because of the requirement, to authenticate a user within a rational period of time, the bit length n must be suppressed to a sufficiently small value, for instance, by dividing the key. When the bit length n is short, however, because of a data format of the template and the requirements to prove that the template is for correct biometrics information, if an encrypted template as the auxiliary information is leaked, it is possible to identify the key and the amounts of characteristic only from the auxiliary information without using new biometrics information, which is problematic from a view point of data security. Namely it is necessary to protect key information or biometrics information, which is personal information, from malicious attackers.

The technique disclosed in T. Charles Clancy, et al. "Secure Smartcard-based Fingerprint Authentication" relates to a method of generating a key from a fingerprint. More specifically, coordinate values on a fingerprint image plane are expressed as elements for a finite body $Fp^2$ (p: prime factor), and a secret key is expressed as coefficient in a k-order polynomial equation f(x) including $Fp^2$ as a coefficient. When a user is registered in a system, $f(x_i)$ is computed for each of coordinate values $x_i$ (i=1,2, ..., n) for n characteristic points (n>K) in a user's fingerprint image (end points and branching points of ridges), and also $(x_i, f(x_i))$ (i=1,2, ..., n) is recorded as auxiliary information. In addition, pairs of elements for $Fp^2$, namely pairs of $(x_i, f(x_i))$ (i=n+1, n+2, ..., n) are generated as false characteristic information at random, and data for the pairs is added to the auxiliary information. When the user is authenticated, n characteristic points are extracted from a fingerprint image newly acquired from the user, and the closest point $X_j$ is guessed for each characteristic point coordinate point $X'_I$ from among characteristic point information (for candidate characteristic points) included in the auxiliary information, and a polynomial equation f(x) satisfying the $y_j=f(x_j)$ is reconstructed for $(x_j, y_j)$, and the coefficients in the reconstructed polynomial equation are used as a secret key.

In this method, a secret key is generated without ordering the characteristic points. According to Y. Dodis, L. Reyzin, and A. Amith, "Fuzzy Extractors: How to Generate Strong Keys from Biometrics and Other Noisy Data", an effective bit length of a secret key (size of a key space which may be attacked when the auxiliary information is leaked) is roughly assessed by the following Equation (1):

$$\log(C(N,n-2t)/C(n,n-2t)) \quad \text{Equation (1)}$$

where a base for the logarithm is 2 (which is applicable also in the following descriptions). C(x,y) denotes the number of combinations for selection of Y elements from X elements, and t denotes the maximum allowable value of the number of erroneous characteristic points during authentication (which is equal to a sum of the number of apparent characteristic points erroneously recognized at places where actual characteristic points are not present and the number of characteristic points present actually present but not recognized). When the number of erroneous characteristic points is not more than t, the key can correctly be restored.

The number (n) of characteristic points varies in each person and in each finger. When a finger print image is acquired with a general fingerprint sensor, the number is in the range from about 10 to about 30. The more the number of false characteristic points (N-n) is, the longer the bit length can be, but when the number of false characteristic points is too many, the distribution is dense. In this case, the characteristic points cannot be recognized correctly at authentication, and therefore the possibility of being unable to correctly restore the key becomes higher.

For instance, when the parameters of N, n and t are set to 64, 20, and 8 respectively taking into consideration the errors caused by translation, rotation, distortion of a finger print or difference caused by different pressures or humidity between at registration and at authentication, the effective bit length calculated through the Equation (1) is at maximum around 7 bits, and the total number of effective keys is 131. In an authentication system in which reentry of registration data is permitted up to 3 times, the probability of success in false registration by an attacker (percentage of erroneous acceptance of a false registration) is about 2%. In T. Charles Clancy, et al. "Secure Smartcard-Based Fingerprint Authentication", it is reported based on experiments that a key with the 69-bitlenth can correctly be restored with the probability of 70% to 80%. However in the experiments, a fingerprint obtained at registration and that for authentication were manually and precisely overlaid on each other to eliminate errors caused by translation or rotation, and the values cannot be achieved when algorithm for automatic execution of overlaying is employed.

Also in the technique disclosed in T. Charles Clancy, et al. "Secure Smartcard-Based Fingerprint Authentication", when an Euclidean distance between two or more actual characteristic points is small, the probability of erroneous estimation for a characteristic point becomes higher at authentication, and also the possibility of correct restoration of a key becomes higher. For the same reason, when auxiliary information is prepared by adding data for false characteristic points to those for actual characteristic points at registration, a false characteristic point cannot be added near an actual characteristic point (within a circle with the radius r around the actual characteristic point). Therefore, an attacker hoping to estimate a secret key by making use of auxiliary information as a clue can determine a key space to be attacked by determining that a pair of characteristic point adjoining each other with a distance not longer than the distance r is a pair of "actual characteristic point, actual characteristic point" or a pair of "false characteristic point, false characteristic point". Therefore, the actual effective bit length of a key becomes further smaller than that estimated through the Equation (1) above. As described above, stability in generation of a key (the probability of generation of a correct key from an actual regular user) is traded off with high security.

An object of the present invention is to provide a method for generating an encryption key using biometrics information and restoring the encryption key ensuring stability in generation of a key and high security for personal authentication and also to provide a system for personal authentication based on biometrics information.

With the present invention both stability in generation of an encryption key using biometrics information and high security may be enhanced with the method for generating an encryption key using biometrics information for personal information.

SUMMARY OF THE INVENTION

In the method for generating an encryption key and restoring the encryption key according to the present, invention, when a person registers personal information, at first, a finger print image of the person is read with a fingerprint sensor at a client's terminal, and characteristic points in the fingerprint are extracted. Then images of the characteristic points are arrayed, numbered, and output as auxiliary information to a recording medium such as an IC card. In addition, the images of characteristic points are associated with the respective numbers, coordinate values for the characteristic points are arrayed, and an encryption key is generated based on the information. The information for the encryption key such as a hash value is registered in a server.

When the person is to be authenticated, at first, a fingerprint image of the person is read with a fingerprint sensor at the client's terminal and characteristic points in the fingerprint are extracted. Furthermore is read the auxiliary information for images of the characteristic points stored in a recording medium such as an IC card in which the personal information is recorded at registration. Then the images of the read characteristic points for authentication are sequentially compared with the images of characteristic points in the auxiliary information to identify coordinate values of the images of characteristic points for authentication that match the auxiliary information, and then the images are arrayed according to an order of the matching images in the auxiliary information to restore the encryption key. In a case where information for the encryption key such as a hash value is registered in the server, when a hash value for the restored encryption key matches the hash value registered in the server, the person is authenticated.

BRIEF DESCRIPTION OF THE DRAWINGS

FIG. 17 is a view illustrating a relation radiation available for label information in the second embodiment of the present invention.

DESCRIPTION OF THE PREFERRED EMBODIMENTS

First Embodiment

A first embodiment of the present invention will be described below with reference to FIG. 1 through FIG. 7, and FIG. 16.

The personal authentication system using biometrics information according to the embodiment is a client-server type user authentication system using the techniques for generating encryption key information for a fingerprint and restoring an encryption key.

At first, a system configuration of the user authentication system according to the first embodiment will be described with reference to FIG. 1.

Figure 1:
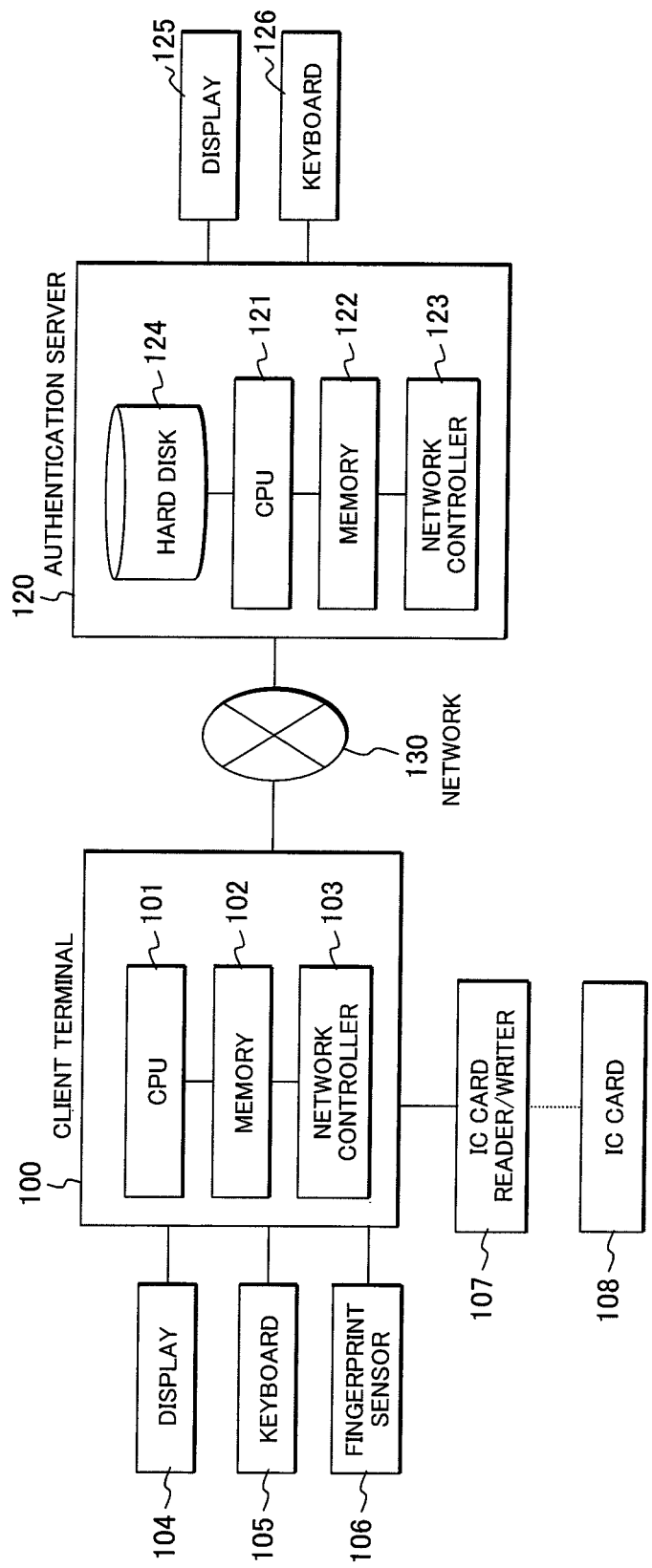
FIG. 1 is a view illustrating a hardware configuration of a user authentication system according to a first embodiment of the present invention.

FIG. 1 is a view illustrating a hardware configuration of a user authentication system according to the first embodiment of the present invention.

Figure 2:
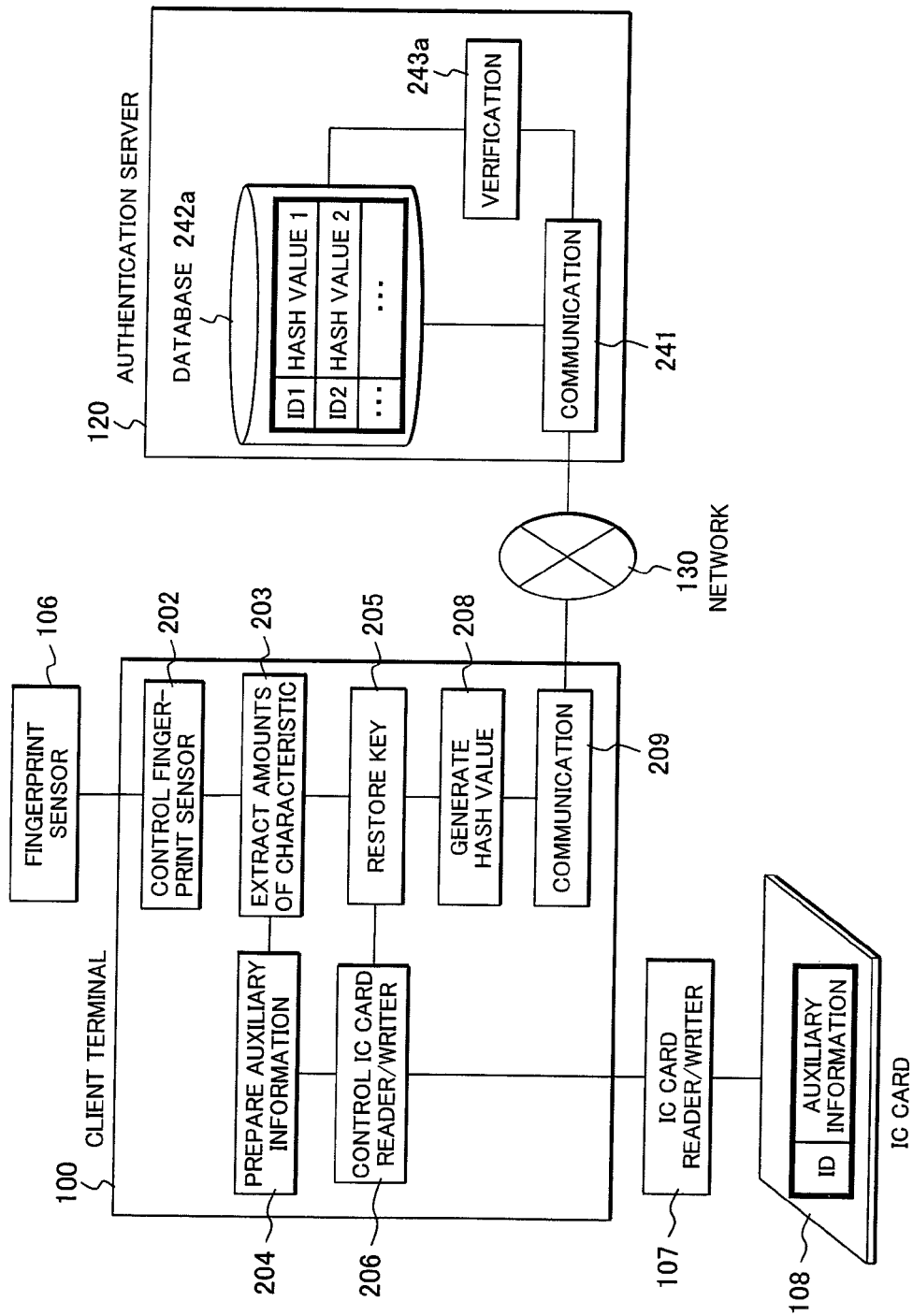
FIG. 2 is a functional block diagram illustrating the user authentication system according to the first embodiment of the present invention.

FIG. 2 is a functional block diagram illustrating the user authentication system according to the first embodiment.

The user authentication system includes, as shown in FIG. 1, a client terminal 100 used by a user when the user utilizes a service provided via a network, an authentication server 120 for determining whether the user trying to utilize the service is a regular member or not, and a network 130 connecting the system components to each other. When applied, for instance, to a network banking service system, the client terminal 100 is a personal computer owned at the user's home, the authentication server 120 is a server machine managed by a bank, and the network 130 is the Internet.

The client terminal 100 has a CPU 101, a memory 102, and a network controller 103, and a display 104, a keyboard 105, a fingerprint sensor 106, and an IC card reader/writer 107 are connected to the terminal 100.

The fingerprint sensor 106 has a function for the acquiring a fingerprint of a user as image information. The IC card reader/writer 107 has a function for reading data from or writing data to an IC card of the user. A portable recording medium having only a function for recording data therein and not having a tamper-proof capability nor an access control function such as a Floppy (registered trade mark) disk or an USB memory, a cellular phone terminal, a magnetic card, and paper (with two-dimensional barcode printed thereon) may be used in place of the IC card.

The authentication server 120 includes a CPU 121, a memory 122, a network controller 123, and a hard disk 124, and a display 125 and a keyboard 126 are connected to the authentication server 120.

A functional configuration of the user authentication system is as shown in FIG. 2, and the client terminal 100 includes a fingerprint sensor control function 202, a characteristic amounts extracting function 203, an auxiliary information preparing function 204, a key restoring function 205, an IC card reader/writer control function 206, a hash value generating function 208, and a communication function 209.

The characteristic amounts extracting function 203 is used for extracting amounts of characteristic from a fingerprint image, the auxiliary information preparing function 204 is used for preparing auxiliary information for restoring an encryption key from the amounts of characteristic. The key restoring function 205 is used for restoring an encryption key from the auxiliary information as well as from the amounts of characteristic extracted from an fingerprint image newly acquired at authentication. The IC card reader/writer control function 206 is used for controlling the IC card reader/writer 107. The hash value generating function 208 is used for generating a hash value from key data. The communication function 209 is used for communication with the authentication server 120 via the network 130.

The IC card reader/writer 107 has a function for writing and reading auxiliary information in or from the IC card 108, and the IC card 108 has a function to store the auxiliary information.

The authentication server 120 has a communication function 241 for communicating with the client terminal 100 via the network 130, a database 242a for storing a hash value in association with the user ID, and a verifying function 243a for comparing a registered hash value with that generated at authentication for verification.

Outline of the processing for registering an encryption key and restoring the encryption key in the method for personal authentication using biometrics information according the embodiment will be described with reference to FIG. 3 and FIG. 16.

Figure 3:
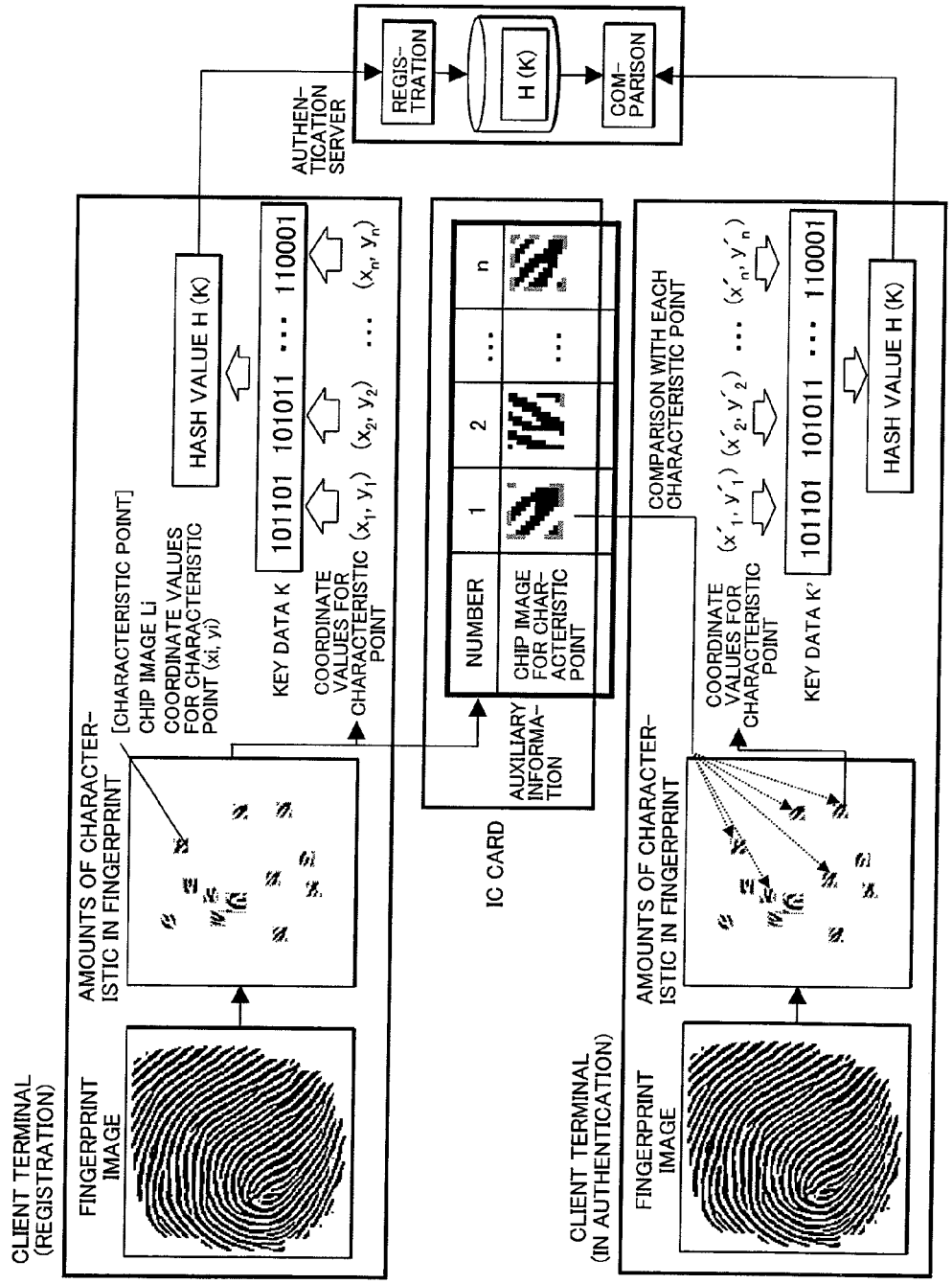
FIG. 3 is a general view illustrating operations for registering and restoring an encryption key using biometrics information for personal authentication according to the first embodiment of the present invention.

FIG. 3 is a schematic view for illustrating the processing for registering and restoring an encryption key in the method for personal authentication according to a first embodiment of the present invention.

Figure 16:
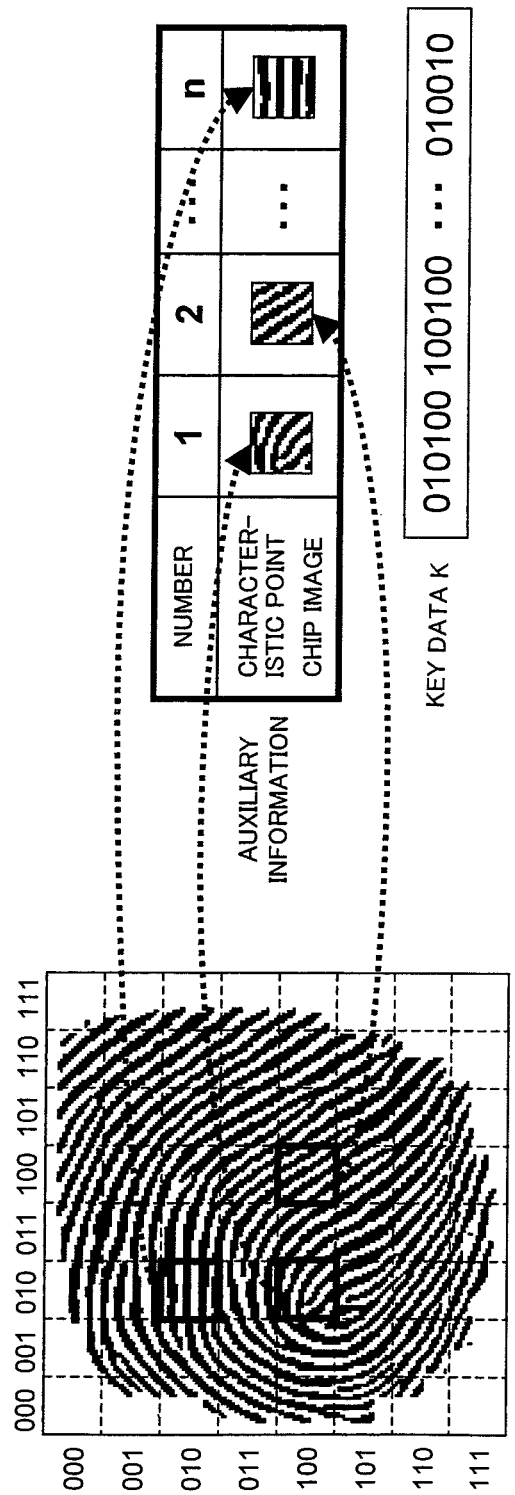
FIG. 16 is a general view illustrating a step dividing a fingerprint image into lattice-like chip images in the first embodiment of the present invention.

FIG. 16 is a schematic for illustrating the processing for cutting off lattice-like chip images.

In the embodiment, when an encryption key is registered, as shown in the upper section in FIG. 3, at first, a fingerprint of a person to be registered is read with the fingerprint sensor 106 shown in FIG. 2, and a local image (chip image) $L_1$ near each characteristic point and coordinate values $(x_i, y_i)$ for the characteristic point are extracted as amounts of characteristic.

Then chip images for characteristic points are arrayed and numbered as auxiliary information and are written in the IC card 108 with the IC card reader/writer control function 206. On the other hand, coordinate values for the characteristic points each with a number assigned thereon as auxiliary information are arrayed according to the same order and output in the order as key data K for an encryption key. For instance, header 3 bits of each of the X-coordinate value and the Y-coordinate value are taken out. Then a hash value H (K) is generated based on the key data K and is registered in the authentication server 120. In this embodiment, the hash value H (K) is registered in the authentication server 120, but the key data K may be registered as it is and used for authentication.

In the embodiment, when the encryption key is to be restored, as shown in the lower stage in FIG. 3, at first a fingerprint image of a person to be authenticated is read with the fingerprint sensor 106. The person requiring authentication inserts the IC card 108, which is carried by the person, into the IC card reader/writer 108 so that the auxiliary information recorded therein is read.

When it is determined that the person is an authentic member having finished registration, it is assumed that his fingerprint is the same as that recorded at the time of registration and that the person carries the IC card reader/writer 108 with the auxiliary information configured with chip images for characteristic points in the fingerprint recorded therein. The assumption is made based on the preposition that a fingerprint is one of the factors which most hardly change in biometrics information of a human.

Images coinciding with chip images for characteristic points included in the auxiliary information sequentially are searched for from the characteristic points in the read fingerprint, the coordinate values $(x'_i, y'_i)$ are acquired and arrayed to generate key data K' according to the same algorithm as that employed for generating key data K from coordinate values at registration. Then a hash H (K') is generated from the key data K and transmitted to the authentication server 120. In the authentication server 120, the registered hash value H (K) is compared with the hash value H (K') to check whether the person to be authenticated is an authentic member of the serve system.

What is to be noted here is that the key data K generated from characteristic points in a fingerprint of a person is not unique, and that various patterns can be prepared by changing a way of arraying chip images for characteristic points.

When an encryption key is registered, chip images obtained by dividing a fingerprint image in a lattice-shape as shown in FIG. 16 may be used. When a fingerprint image is divided to 64 chip images as shown in FIG. 16, each of the chip images can be expressed with 6 bits. In this case, n chip images selected from the 64 images in all and arrayed according to an appropriate sequence are used as auxiliary information and 6-bit information in which coordinate values are arrayed according to the same sequence is used as key data K.

When the encryption key is restored, positions coinciding with the chip images in auxiliary information are searched from a fingerprint image newly read, and coordinate values for the positions are expressed with 6 bits respectively to generate the key data K'.

The processing for registration of a user in the embodiment will be described with reference to FIG. 4.

Figure 4:
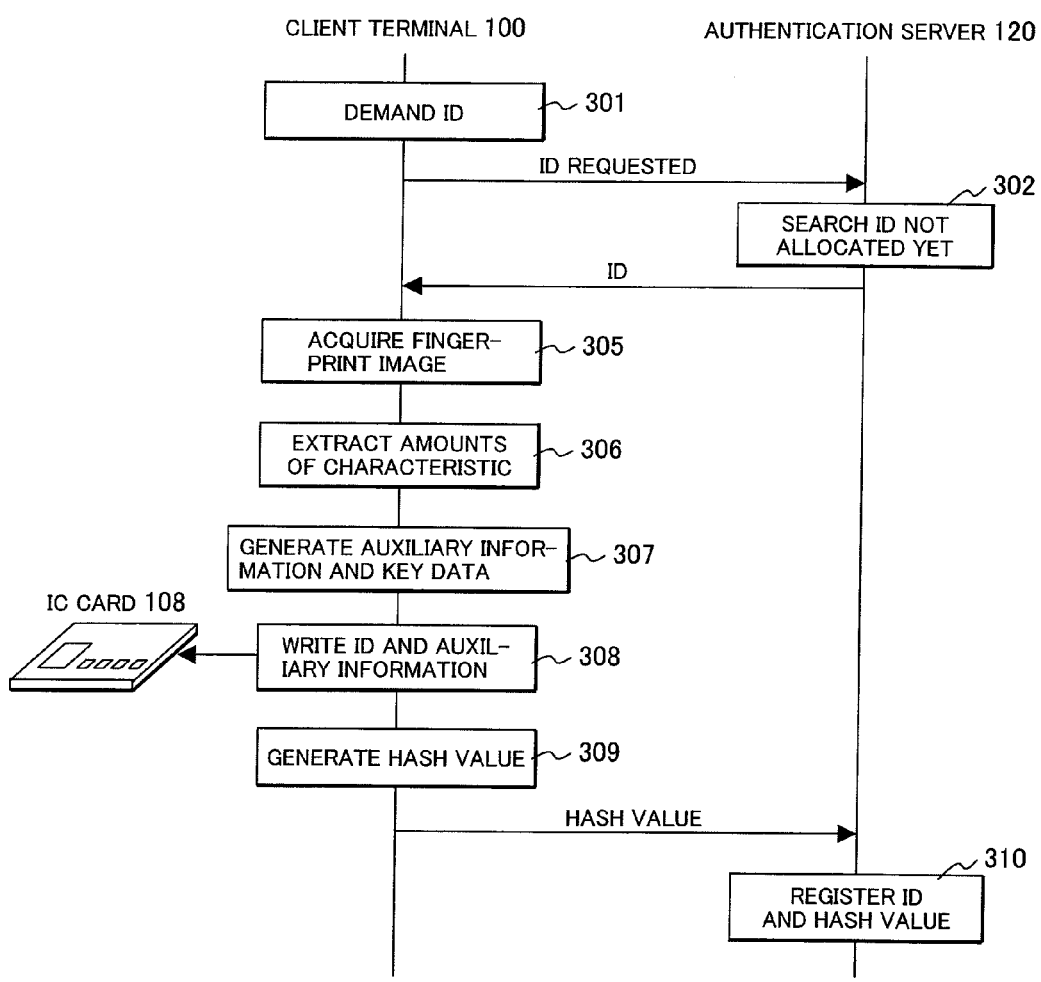
FIG. 4 is a flow chart illustrating a sequence of operations for registering a user in the first embodiment of the present invention.

FIG. 4 is a flow chart illustrating a sequence of operations for registering a user in the first embodiment of the present invention.

The client terminal 100 demands the authentication server 120 to allocate an ID to a user hoping to make registration anew (step S301).

The authentication server 120 searches an ID not used nor allocated to any user upon the demand for ID allocation for the client terminal 100, and sends a found ID to the client terminal 100 (step 302).

Then the client terminal 100 acquires a fingerprint image of the user with the fingerprint sensor 106 (step 305).

Then the client terminal 100 extracts amounts of characteristic from the fingerprint image (step 306). In the embodiment, coordinate values for multiple characteristic points in a fingerprint image and chip images near the characteristic points are used as amounts of characteristic.

Then the client terminal 100 prepares auxiliary information and key data from the amounts of characteristic (step 307). The auxiliary information is used when an encryption key is restored from a fingerprint of the user. Details of a sequence of operations for preparing the auxiliary information and key data will be described later.

Then the client terminal 100 writes the ID and auxiliary information received from the authentication server 120 with the IC card reader/writer 107 in the IC card 108 carried by the user (step 308).

The client terminal 100 generates a hash value from the key data and transmits the hash value to the authentication server 120 (step 309).

Finally, the authentication server 120 associates the hash value received from the client terminal 100 with the ID and accepts registration of the user (step 310).

Next, a sequence of the operations for extracting amounts of characteristic (step 306) and for generating the auxiliary information and key data (step 307) in the processing sequence for registration of a user in the embodiment will be described in detail below with reference to FIG. 5.

Figure 5:
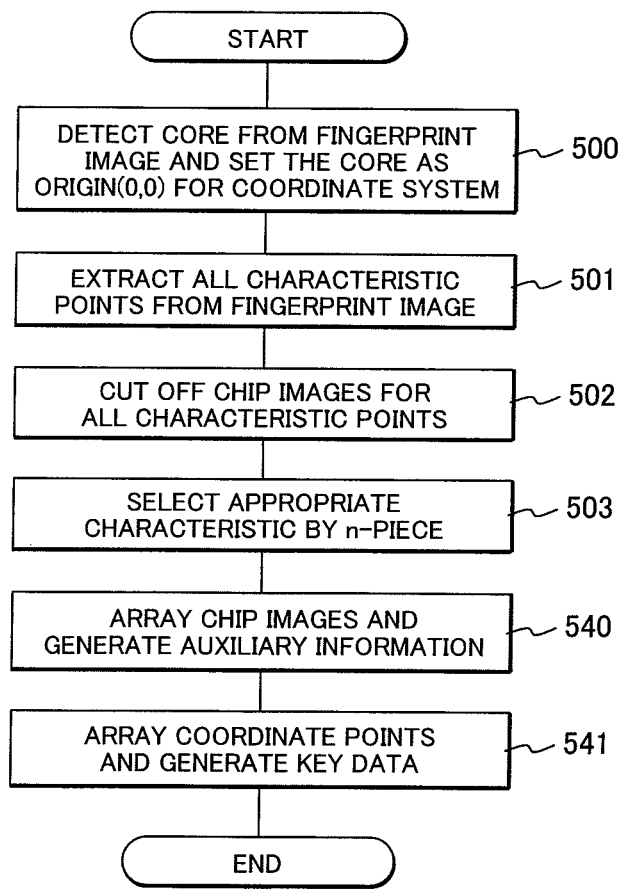
FIG. 5 is a flow chart illustrating operations for extracting amounts of characteristic 8 (step 306) and generating auxiliary information and key data (step 307) in the first embodiment.

FIG. 5 is a flow chart illustrating the processing steps of extracting amounts of characteristic (step 306) and of generating auxiliary information and key data (step 307) in the first embodiment of the present invention.

The characteristic amounts extracting function 203 detects a core from a fingerprint image and sets the position as an origin (0, 0) for a coordinate system (step 500). The term of core as used herein indicates a center of a swirl of ridges in a fingerprint. When there is no core, one of characteristic points extracted in the next step may be set as an origin for the coordinate system. In this case, the information about the characteristic point is not included in chip information 410, and only a chip image for the characteristic point is separately included in the auxiliary information.

The characteristic amounts extracting function 203 extracts all characteristic points from a fingerprint image (step 501). The specific algorithms for the process of extracting characteristic points and for the process of detecting a core will be described, for instance, A. Jain and S. Pankanti, "Automated Fingerprint Identification and Imaging Systems,".

Then, chip images are acquired for all of the characteristic points as shown in FIG. 3 (step 502), and only appropriate characteristic points are selected from all of the acquired characteristic points (step 503).

Then all of the selected chip images are ordered at random, and auxiliary information is generated based on the ordered chip images (step 540).

Coordinate values for the characteristic points are arrayed in the same sequence as that of the chip images to generate key data for an encryption key (step 541).

Next a sequence of operations for authenticating a user will be described below with reference to FIG. 6.

Figure 6:
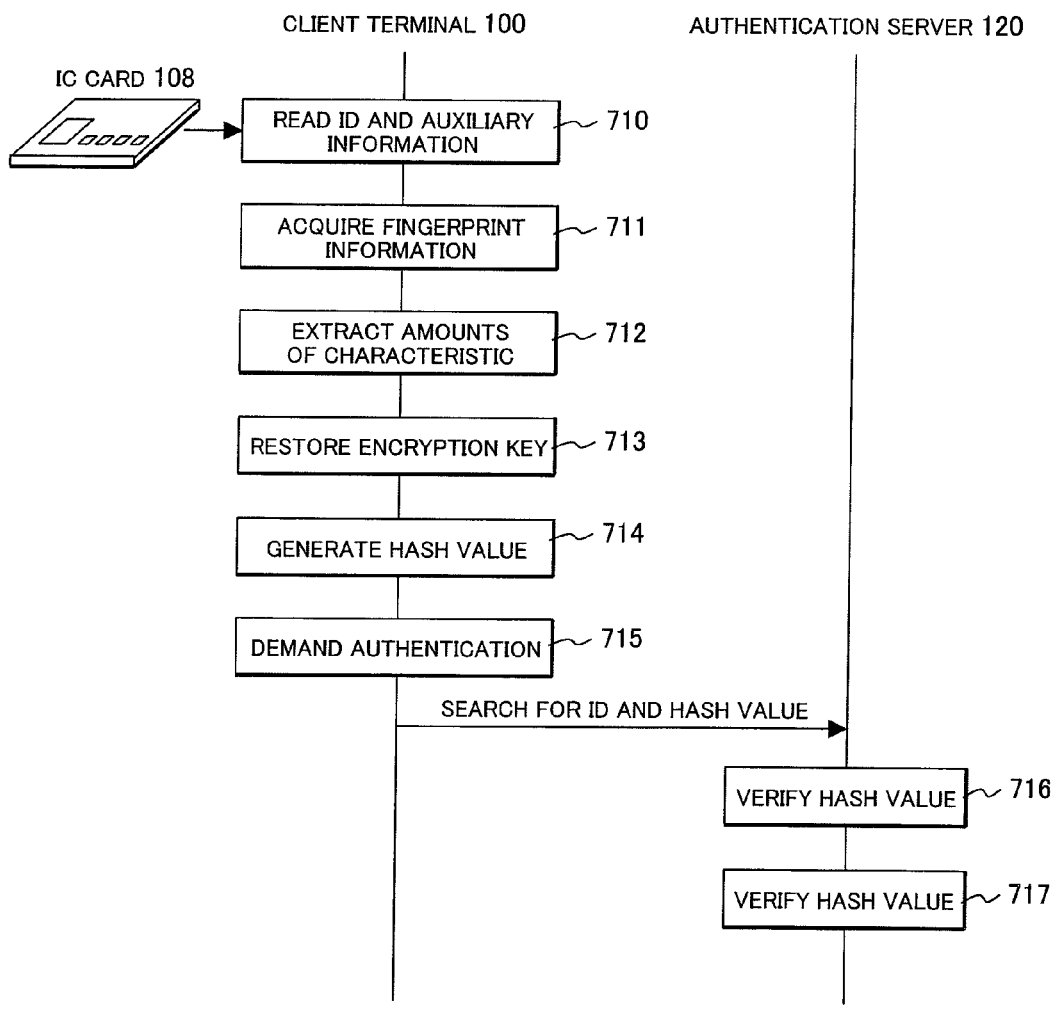
FIG. 6 is a flow chart illustrating a sequence of operations for authenticating the user in the first embodiment.

FIG. 6 is a flow chart illustrating a flow of operations for authenticating a user in the first embodiment of the present invention.

The authentication process is performed by the authentication server 120 to authenticate a fingerprint of a user through a network when the user hopes to utilize services such as those provided by a network banking system.

The client terminal 100 reads an ID and auxiliary information with the IC card reader/writer 107 from the IC card 108 carried by the user (step 710).

Then the client terminal 100 acquires a fingerprint image of the user (step 711), and extracts amounts of characteristic from the acquired fingerprint image (step 712).

Then the client terminal 100 restores an encryption key from the extracted amounts of characteristic and the auxiliary information (step 713). Details of the process for restoring an encryption key will be described later.

A hash value is generated from the restored encryption key (step 714).

Then the client terminal 100 sends a demand of authentication to the authentication server 120, and also sends the ID and the hash value (step 715).

Then the authentication server 120 receives the ID and the hash value, searches for a hash value corresponding to the ID from the database 242$a$ (step 716), and compares the hash value with that transmitted from the client terminal 100 (step 717). When the two hash values are identical, a result of authentication is successful, and when the two hash values are different, a result of the authentication is a failure.

Next a sequence of operations for extracting amounts of characteristic (step 712) and for restoring an encryption key (step 713) will be described in detail below with reference to FIG. 7.

Figure 7:
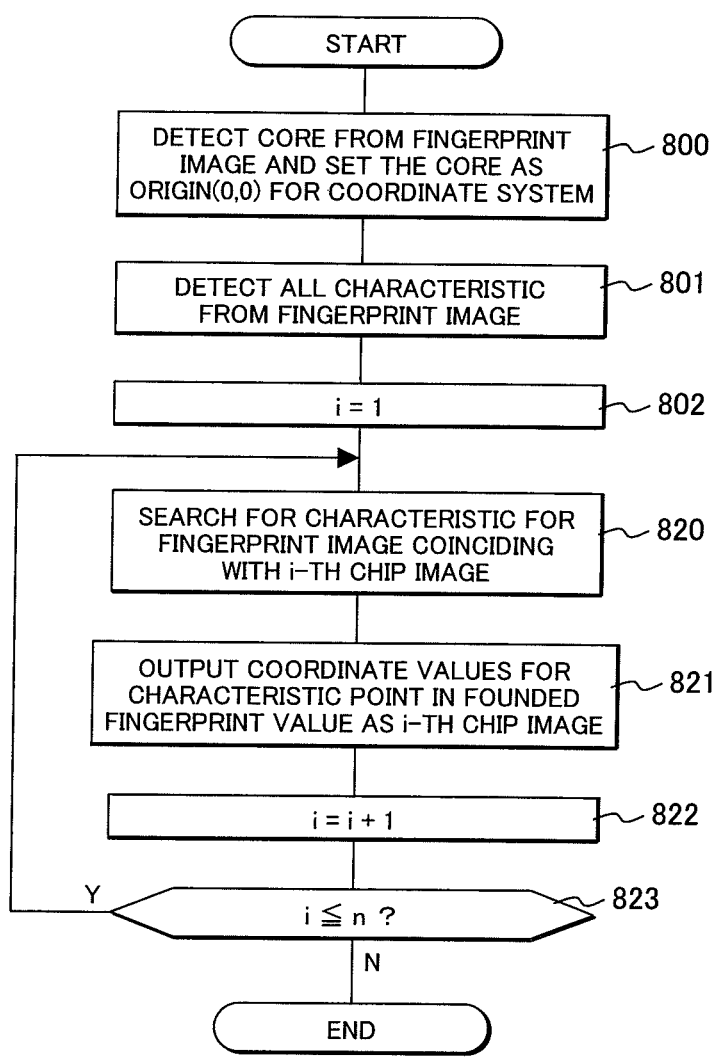
FIG. 7 is a flow chart illustrating detailed operations for a step of extracting amounts of characteristic 8 step 712) and a step of restoring an encryption key (step 713) in the operation flow for user authentication in the first embodiment.

FIG. 7 is a flow chart illustrating in detail a sequence of operations for extracting amounts of characteristic (step 712) and for restoring an encryption key (step 713) in the process for authentication of a user in the first embodiment of the present invention.

The characteristic amounts extracting function 203 detects a core from a fingerprint image, and sets the position as an origin (0, 0) for a coordinate system (step 800). Any other characteristic point may be selected as an origin. In that case, other characteristic points are expressed with relative coordinate values against the selected characteristic point.

The characteristic amounts extracting function 203 detects all characteristic points from a fingerprint image (step 801).

i is set to 1 (i=1) (step 802).

It is assumed therein that the number of chip images included in the auxiliary information is n as shown in FIG. 3.

A characteristic point for a fingerprint coinciding with the i-th chip image in the auxiliary information is searched for (step 820).

Coordinate values for the characteristic point found as described above are output as the first key data (step 821).

Then a value of i is incremented by 1 (i=i+1) (step 822).

Whether i is not more than n (i≦n) is determined. When i is smaller than n, the processing is terminated. When i is not more than n, the processing returns to step 820 (step 823).

Second Embodiment

A second embodiment of the present invention will be described with reference to FIG. 8 through FIG. 15.

In the first embodiment, characteristic points in a fingerprint are arrayed and key data for an encryption key is generated from coordinate values for the characteristic points.

In the second embodiment, precision in the method for generating an encryption key using biometrics information and in method for restoring the encryption key are improved as compared to that in the first embodiment. Also stability of an encryption key and durability against attacks by illegal attackers are substantially improved as compared to those in the first embodiment.

To achieve the objectives, relation between chip images and coordinate data are two-dimensional, and furthermore dummy data is included in auxiliary information for making it more difficult for an attacker to decode the encryption key.

The client-server type user authentication system shown in FIG. 1 in the first embodiment is used for the hardware.

In the first embodiment, the so-called secret key encryption system is employed and in this system the same key is used for both encryption and decryption. In the second embodiment, however, the public key system is employed, and in this system, a key used for encryption is different from that used for decryption, and personal authentication is carried out by checking a signature with a secret key in a server.

At first, a functional configuration of the user authentication system according to the second embodiment will be described with reference to FIG. 8, and descriptions are provided mainly for difference of the system from that in the first embodiment.

Figure 8:
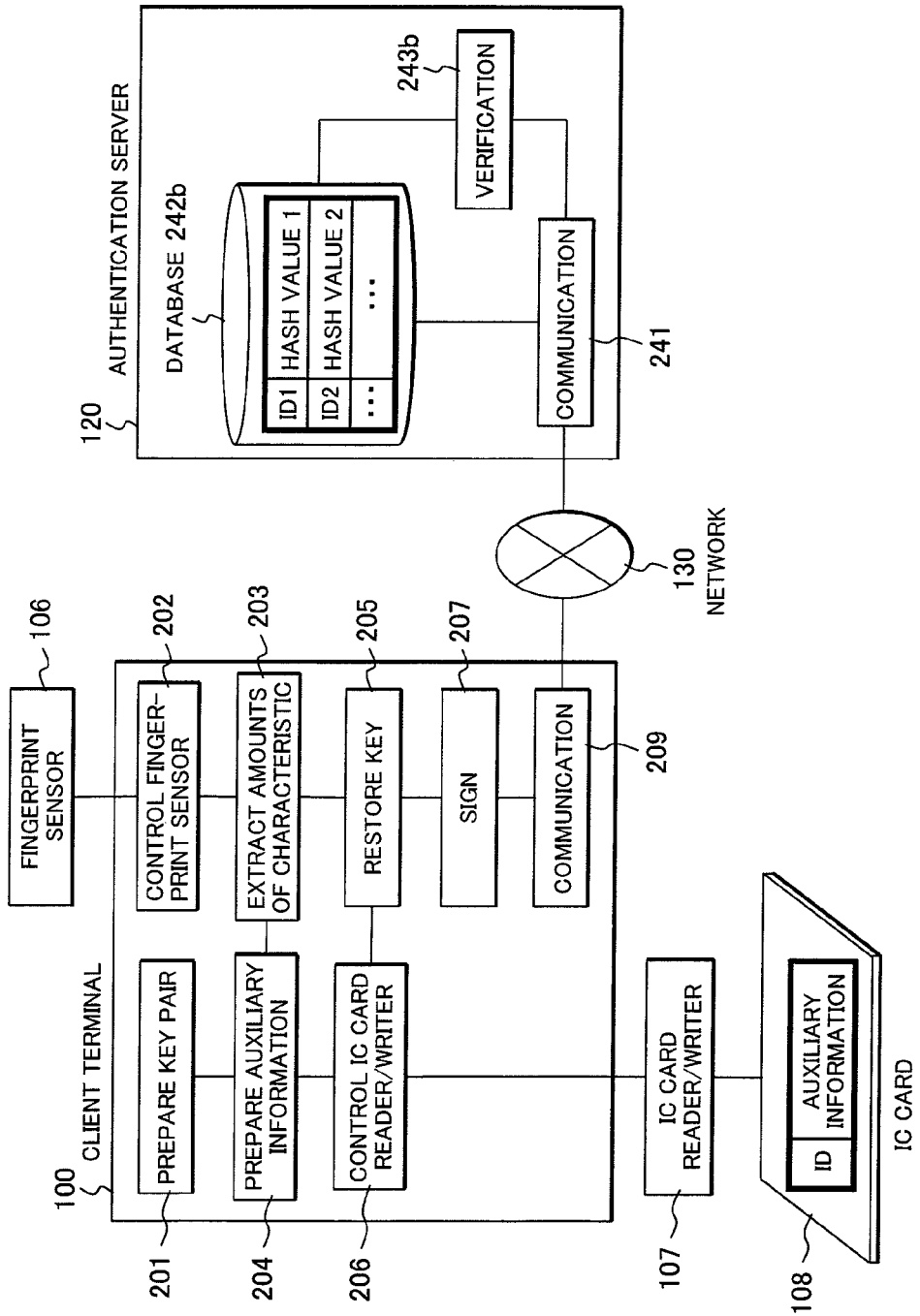
FIG. 8 is a functional block diagram illustrating a user authentication system according to a second embodiment of the present invention.

FIG. 8 is a functional block diagram illustrating the user authentication system according to the second embodiment.

The client terminal 100 has a key pair generating function 201 and a signature function 207. The key pair generating function 201 is used for generating a pair of a public key and a secret key. The signature function 207 is used for generating a signature for challenge code from the authentication server 120 by using the secret key. The characteristic amounts extracting function 203 and the key restoring function 205 are used for realizing algorithms in the second embodiment.

A public key is stored in association with a user ID in a database 242$b$ of the authentication server 120 and the authentication server 120 performs verification 243$b$ of a secret key generated by the client terminal 100 using the public key stored therein by means of challenge and response at authentication.

Next data structures of the secrete key and the auxiliary information according to the present invention will be described with reference to FIG. 9.

Figure 9:
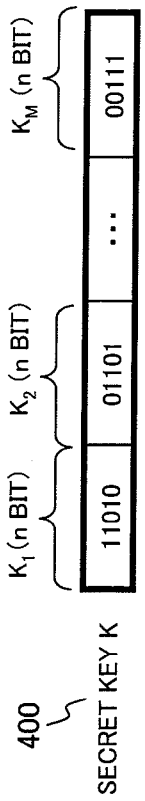
FIG. 9 is a view illustrating a data structure of a secret key and auxiliary information in the second embodiment.

FIG. 9 is a view illustrating data structure of a secret key and auxiliary information according to a second embodiment of the present invention.

It is assumed in the following description that a bit length of a secret key K400 is nM bits for integral parameters n, M ($M \leq 2^n-1$). When n and M are sufficiently larger, a bit length of the key is long, but stability in key generation decreases. When the probability of correct restoration of a secret key from an authentic fingerprint is 80 to 90%, n is in the range from about 4 to about 6. With the n in the range as defined above, the equation of $N=2^n$ is applied. When the data (with L bits) to be used as a secret key has a bit length longer than nM bits, information for lower L-nM bits is fixed and included in the auxiliary information.

n-bit partial information obtained by dividing the secret key K400 to M equal portions are sequentially numbered as $K_i$ (i=1, 2, ..., M).

Auxiliary information includes characteristic point information 410, a code conversion table 420, and error correction information (ECC) 430. The characteristic point information 410 includes a characteristic point number, a chip image, and a candidate point table for each of the M characteristic points. In the following description, a chip image for the chip No. i is expressed as C[i], and one record in the candidate point table (referred to as "candidate point record") is referred to as T[i]. The candidate point record T[i] has N candidate points, and coordinate values (correct coordinate values) for only one characteristic point corresponding to the chip image C[i] is included in the data at registration. Furthermore the j-th candidate point for T[i] is expressed as T[i, j] in the following description. The code conversion table includes therein information for allocating N different partial key codes (for instance, 00000, 00001, 00010, ..., 11110, 11111 when N is equal to 32) each having the bit length of n bits to candidate point numbers j (j=1, 2, ..., N). The error correction information 430 is code with the bit length of nM bits, and is used for correcting an error in the restored key using the RS code.

Next, the processing for registering a user in the embodiment will be described with reference to FIG. 10.

Figure 10:
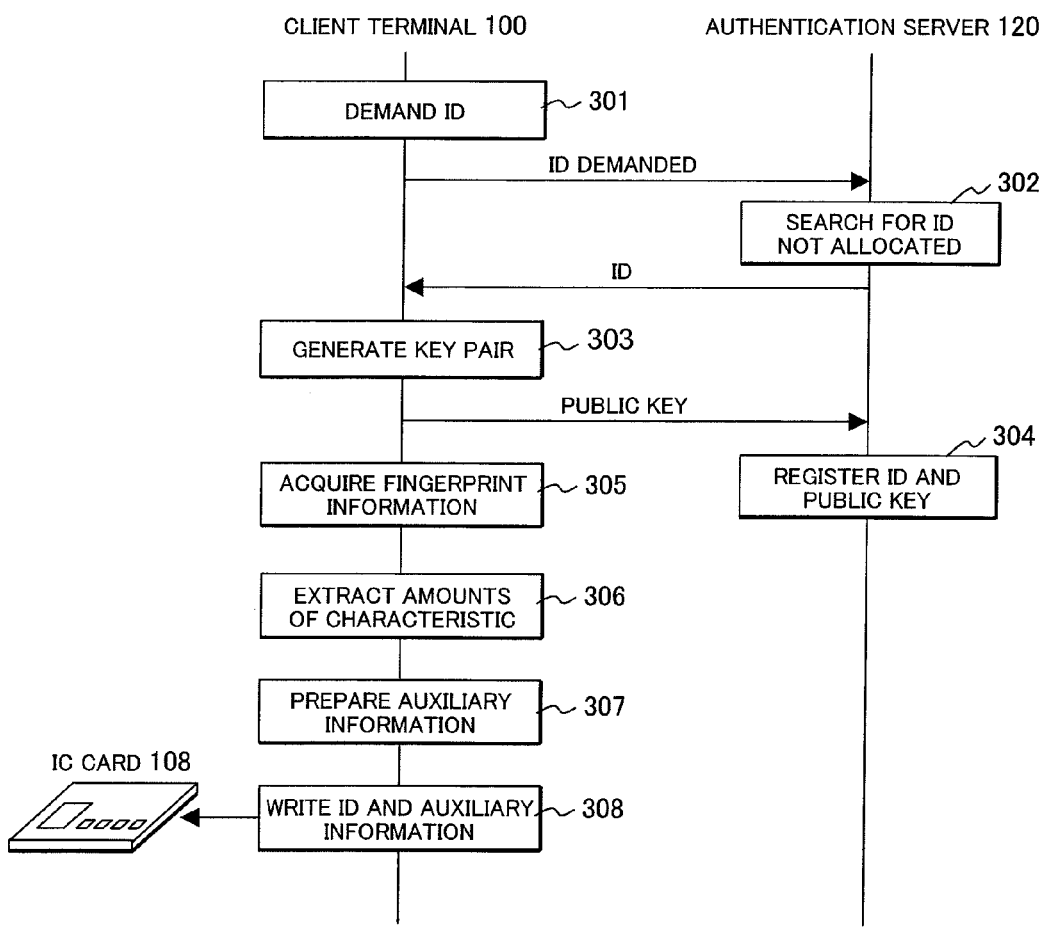
FIG. 10 is a flow chart illustrating a sequence of operations for user registration in the second embodiment.

FIG. 10 is a flow chart illustrating a processing for registration of a user according to the second embodiment of the present invention.

The client terminal 100 demands the authentication server 120 to allocate an ID to a user hoping to make registration anew (step 301).

The authentication server 120 searches an ID not used nor allocated to any user upon the demand for ID allocation for the client terminal 100, and sends a found ID to the client terminal 100 (step 302).

Then the client terminal 100 generates a pair of a public key and a secret key based on the public key encryption technique such as elliptic encryption, and transmits the public key to the authentication server 120 (step 303).

The authentication server 120 registers the received public key in association with the ID in the database 242b (step 304).

Then the client terminal 100 acquired a fingerprint of the user via the fingerprint sensor 106 (step 305), and extracts amounts of characteristic from the fingerprint image (step 306). Also in this second embodiment, the amounts of characteristic is coordinate values for a plurality of characteristic points in the fingerprint image and local images (chip images) near each of the characteristic points.

The client terminal 100 generates auxiliary information from the extracted amounts of characteristic and the secret key (step 307). The auxiliary information is used for restoring a secret key from a fingerprint of a user at authentication.

Details of the data structure in the auxiliary information are as shown in FIG. 9. A method of generating the auxiliary information will be described later.

The client terminal 100 writes the ID and the auxiliary information with the IC card reader/writer 107 in the IC card 108 carried by the user (step 308).

The processing sequence of operations for extracting amounts of characteristic (step 306) and for generating auxiliary information (step 307) will be described in detail below with reference to FIG. 11 and FIG. 12.

Figure 11:
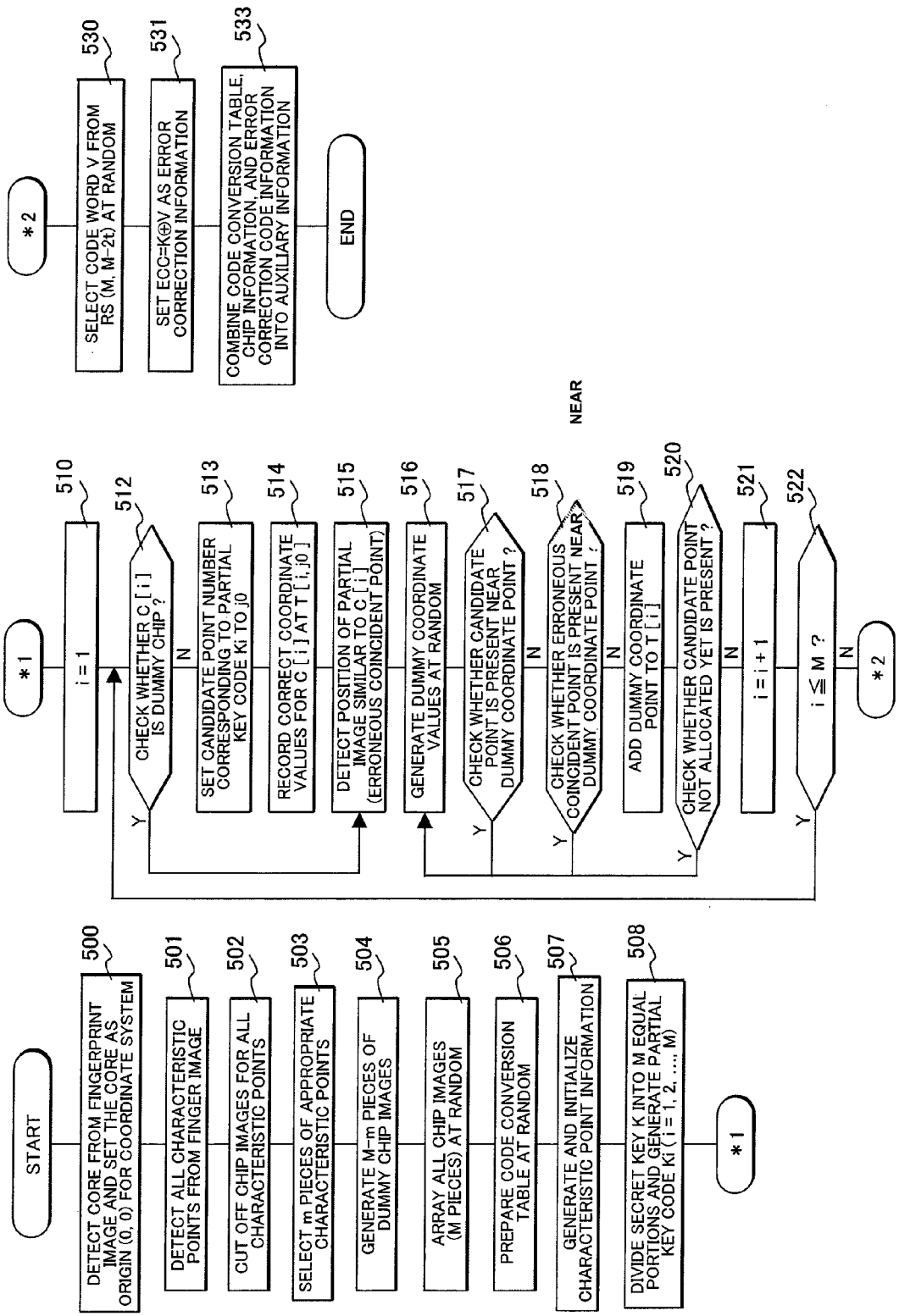
FIG. 11 is a flow chart illustrating detailed operations for a step of extracting amounts of characteristic (step 306) and a step of preparing auxiliary information (step 307) in user registration in the second embodiment.

FIG. 11 is a flow chart illustrating detailed sequence of operations for extracting amounts of characteristic (step 306) and for generating auxiliary information (step 307) in the processing for registration of a user in the second embodiment.

Figure 12:
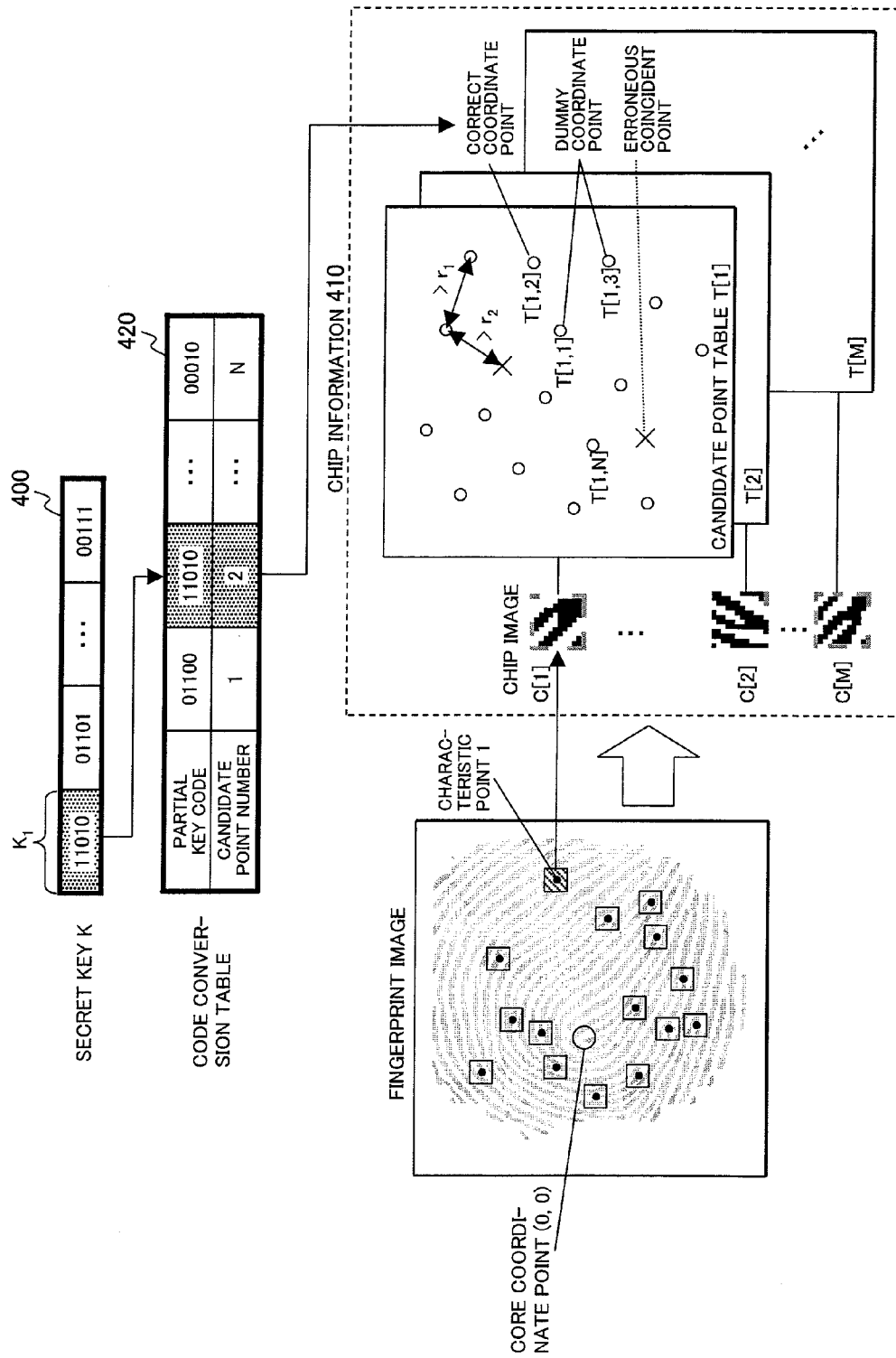
FIG. 12 is a view illustrating a step of extracting amounts of characteristic and a step of preparing auxiliary information in user registration in the second embodiment.

FIG. 12 is a view illustrating the situation in extraction of amounts of characteristic and generation of auxiliary information in the processing for generation of a user in the second embodiment.

At first, the characteristic amounts extracting function 203 detects a core from a fingerprint image, and sets the position as an origin (0, 0) for a coordinate system (step 500). In the fingerprint image shown in FIG. 12, a position where a white circle (○) is present near a center of the image is a core. When a core is not found, one of the characteristic points extracted in the next step may be used as an origin. In this case, information concerning the characteristic point is not included in the chip information 410, and only the chip image for the characteristic point is included in the auxiliary information to indicate that the characteristic point is used as an origin.

The characteristic amounts extracting function 203 detects all of characteristic points in a fingerprint image (step 501). In the fingerprint image shown in FIG. 12, the position of a black circle (●) is a characteristic point. The detailed algorithms for the processing of extracting a characteristic point and for the processing for detecting a core is known, for instance, in the method disclosed in A. Jain and S. Pankanti, "Automated Fingerprint Identification and Imaging Systems,".

Then chip images are cut off for all of the characteristic points (step 502). In the fingerprint image shown in FIG. 12, a square (□) surrounding the black circle (●) is a region of a chip image.

Only appropriate characteristic points are selected from all of the characteristic points. The number of selected characteristic points is herein assumed as m (step 503). For instance, when there are multiple characteristic points, chip images of which are similar to each other, if all of them are used because of the restrictive conditions for the candidate points as described below (that no candidate point is not generated near an erroneously coincident point) there is the possibility that an attacker trying to guess the key based on the auxiliary information can figure out the key space. Therefore, when there are multiple characteristic points similar to each other, only one of the characteristic points is used. Furthermore, when a distance between two characteristic points is short and chip images for the characteristic points overlap each other, a relation positional relation between the two characteristic points is guessed from the auxiliary information, and there is the possibility also in this case that the attacker can figure out the key space. Therefore, also in this case, only one of the characteristic points is used.

Next, M-m pieces of dummy chip images not resembling the m pieces of chip images described above are generated at random (step 504).

All of the M pieces of chip images are ordered at random (step 505). All of the chip images are expressed as C[i] (i=1, 2, ..., M) according to the order. In the example shown in FIG. 12, a chip image for the characteristic point at the top right portion of the fingerprint image is C[1].

The code conversion table 420 is generated (step 506). The table 400 may be prepared at random, or a code conversion table previously prepared may be used. In the latter case, for instance, it is conceivable to allocate a binary number expression (n bits) of j to the candidate number j as partial key code.

Then characteristic point information 410 is generated, and C[i] (i=1, 2, ..., M) is recorded. Also a flag indicating that the partial key code is not allocated to T[I,j] (i=1, 2, ..., M; j=1, 2, ..., N) is recorded (step 507).

The secret key K400 (nM bits) is divided to M equal portions, and partial key code $K_i$ (i=1, 2, ..., M) each having a bit length of n bits is prepared (step 508).

i is set to 1 (step 510).

When C[i] is a dummy chip image, the processing jumps to step 515 (step 512).

Then, a candidate point number for the partial key code $K_i$ is searched for from the code conversion table 420 (step 513). In the example shown in FIG. 12, when i is 1 (i=1), the partial key code $K_1$ is "11010", so that "11010" is retrieved from the code conversion table 420 to obtain the candidate point number "2". Therefore j0 is set to 2. j0 takes a different value for each i.

Coordinate values (correct coordinate values) for the characteristic point C[i] are recorded (step 514) at T[I, j0] in the characteristic point information 410. In the example shown in FIG. 12, when i=1, j0 is equal to 2, so that the correct coordinate values are recorded as T[1,2].

Positions of a partial images resembling C[i] (erroneously coincident points) are detected, in addition to the coordinate values for C[i], from the fingerprint image (step 515). Namely the erroneously coincident point is a point which resembles a characteristic point in a chip image thereof and may erroneously be determined. For instance, when a fingerprint image is expressed as a binary value image (monochrome image), the similarity between the images can be computed as the number of points where the color is identical when the chip image and the partial image are overlaid on each other. In the example shown in FIG. 12, an erroneously coincident point is expressed as x, and in the figure there are two erroneously coincident points for C[1].

Next, dummy coordinate values are generated at random (step 516).

When a candidate point already recorded in the record T[i] in the candidate point table is away from by a prespecified threshold value r1 or below between the candidate point and the dummy coordinate point, the processing returns to step 516. (step 517)

When there is any one, among the erroneously coincident points, away from the dummy coordinate point by a prespecified threshold value r2 or below, the processing returns to step 516 (step 518).

When it is determined in step 517 that a candidate point away from the dummy coordinate point by a distance of r1 or below is not recorded, and furthermore when it is determined in step 518 that there is no erroneously coincident point away from the dummy coordinate point by a distance of r2 or below, the dummy coordinate point is recorded at a not-allocated candidate point T[i, j] in the candidate point table T[i] (step 519). As described above, when a dummy coordinate point is to be set, the dummy coordinate point is set away from the candidate point as well as from the erroneously coincident point by a prespecified distance to prevent generation of erroneous recognition.

When it is determined that any one not allocated yet is included among N pieces of candidate points T[i, j] in the candidate point table T[i], the processing returns to step 516 (step 520). FIG. 12 shows the situation in which the steps 516 to 520 are repeated and 16 characteristic point candidates (including one correct coordinate point) are set at C[1].

i is set to 1 (i=i+1) (step 521)

When I≦M, the processing returns to step 512. (step 522).

Code word V is selected at random from the code length M on a finite body $F2^n$ and RS code RS for the information code number M-2t (M, M-2t) (step 530). A necessary value is used for the parameter t as the number of correctable errors. When t is large, the capability of error correction is high, and the secret key can be restored more stably, but the effective bit length of the secret key becomes shorter.

The error correction code 430 is an exclusive OR of K and V when the ECC is as expressed by the Equation 2 below.

$$ECC = K(+)V \qquad \text{Equation 2}$$

Here, (+) indicates exclusive OR (step 531).

Finally the characteristic point 410, code conversion table 420, and error correction code (ECC) 430 are combined into auxiliary information (step 533).

The processing for authentication of a user will be described below with reference to FIG. 13.

Figure 13:
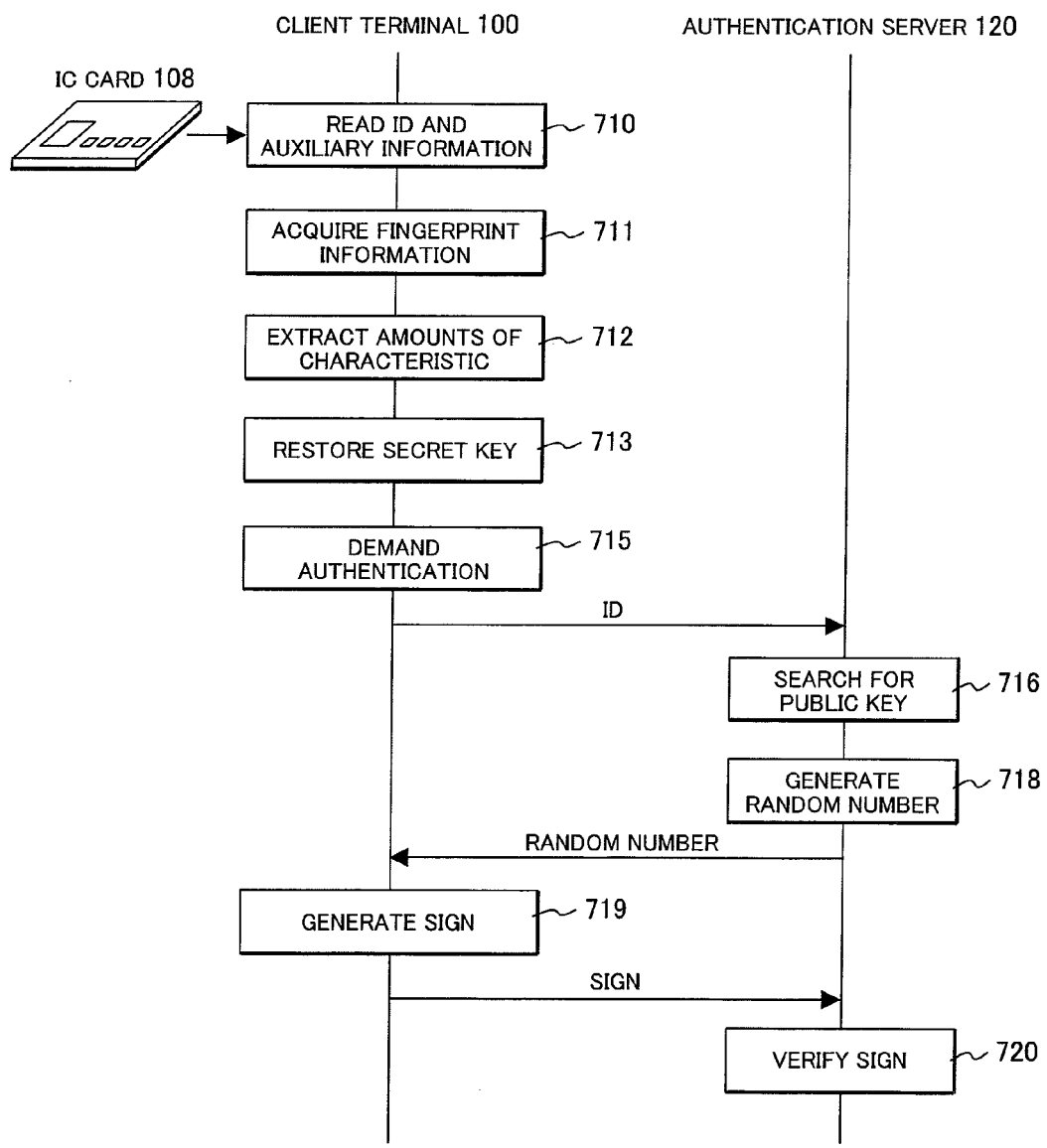
FIG. 13 is a flow chart illustrating a sequence of operation for user authentication in the second embodiment.

FIG. 13 is a flow chart illustrating a sequence of operations for authenticating a user in the second embodiment of the present invention.

Like in the first embodiment, the authentication process is performed by the authentication server 120 to authenticate a fingerprint of a user through a network when the user hopes to utilize services such as those provided by a network banking system.

The client terminal 100 reads an ID and auxiliary information with the IC card reader/writer 107 from the IC card carried by the user. (step 710)

Then the client terminal 100 acquires a fingerprint image of the user (step 711), and extracts amounts of characteristic from the fingerprint image (step 712). In the first embodiment, it is assumed that the same user's fingerprint does not change, but an actually acquired fingerprint image is different from that acquired in step 305 at registration even when the fingerprint is acquired from the same person. This change occurs due to a positional displacement, rotation, distortion, or pressure when a finger is placed on a sensor, or due to a difference in humidity. Therefore, the number of characteristic points and coordinate values thereof, and chip images acquired at registration are slightly different from those acquired at authentication. In the present invention, the errors as described above are adjusted, and a method for restoring a correct secret key stably is provided.

The client terminal 100 restores a secret key from the extracted amounts of characteristic as well as from the auxiliary information (step 713). The processing for restoring a secret key will be described in detail below.

The client terminal 100 demands authentication to the authentication server 120 and transmits the ID (step 715).

The authentication server 120 receives the ID transmitted from the client terminal 100 and searches for a public key for the ID from the database 242b (step 716).

The authentication server 120 generates a random number, and transmits the random number as challenge code to the client terminal 100 (step 718).

The client terminal 100 receives the transmitted random number, generates a signature with the secret key for the random number, and transmits the signature to the authentication server 120 (step 719).

The authentication server 120 receives the signature and verifies the signature using the public key stored therein (step 720). When the signature is verified successfully, the authentication is successful. When the signature is not authenticated, the authentication is a failure.

Then a sequence of operations for extracting amounts of characteristic (step 712) and for restoring a secret key (step 713) in the authentication processing will be described with reference to FIG. 14, FIG. 15, and FIG. 17.

Figure 14:
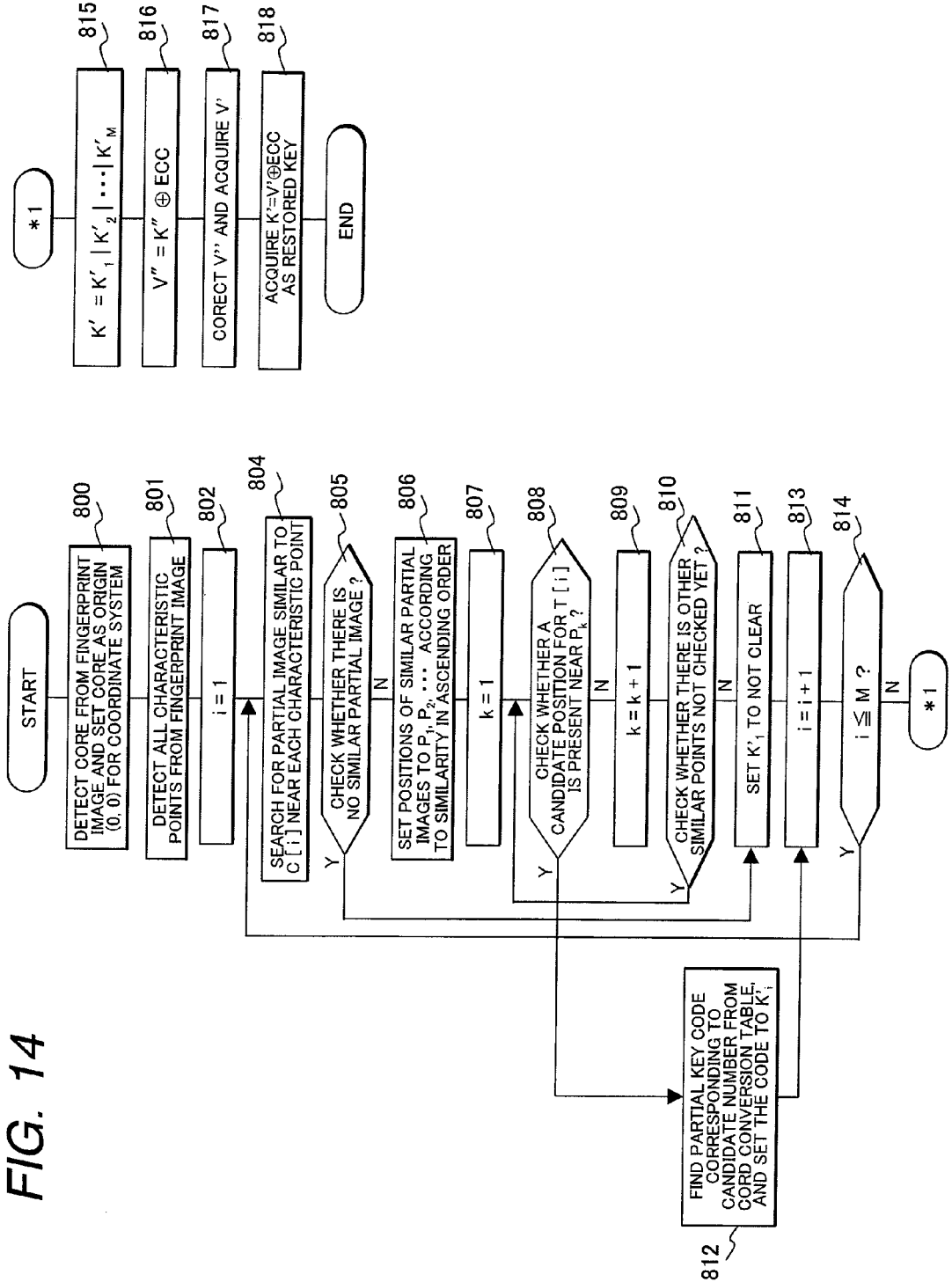
FIG. 14 is a flow chart illustrating detailed operations for a step of extracting amounts of characteristics 8 (step 712) and a step of restoring an encryption key (step 713) for user authentication in the second embodiment.

FIG. 14 is a flow chart illustrating in detail a sequence of operations for extracting amounts of characteristic (step 712) and for restoring a secret key (step 713) in the authentication processing in the second embodiment of the present invention.

Figure 15:
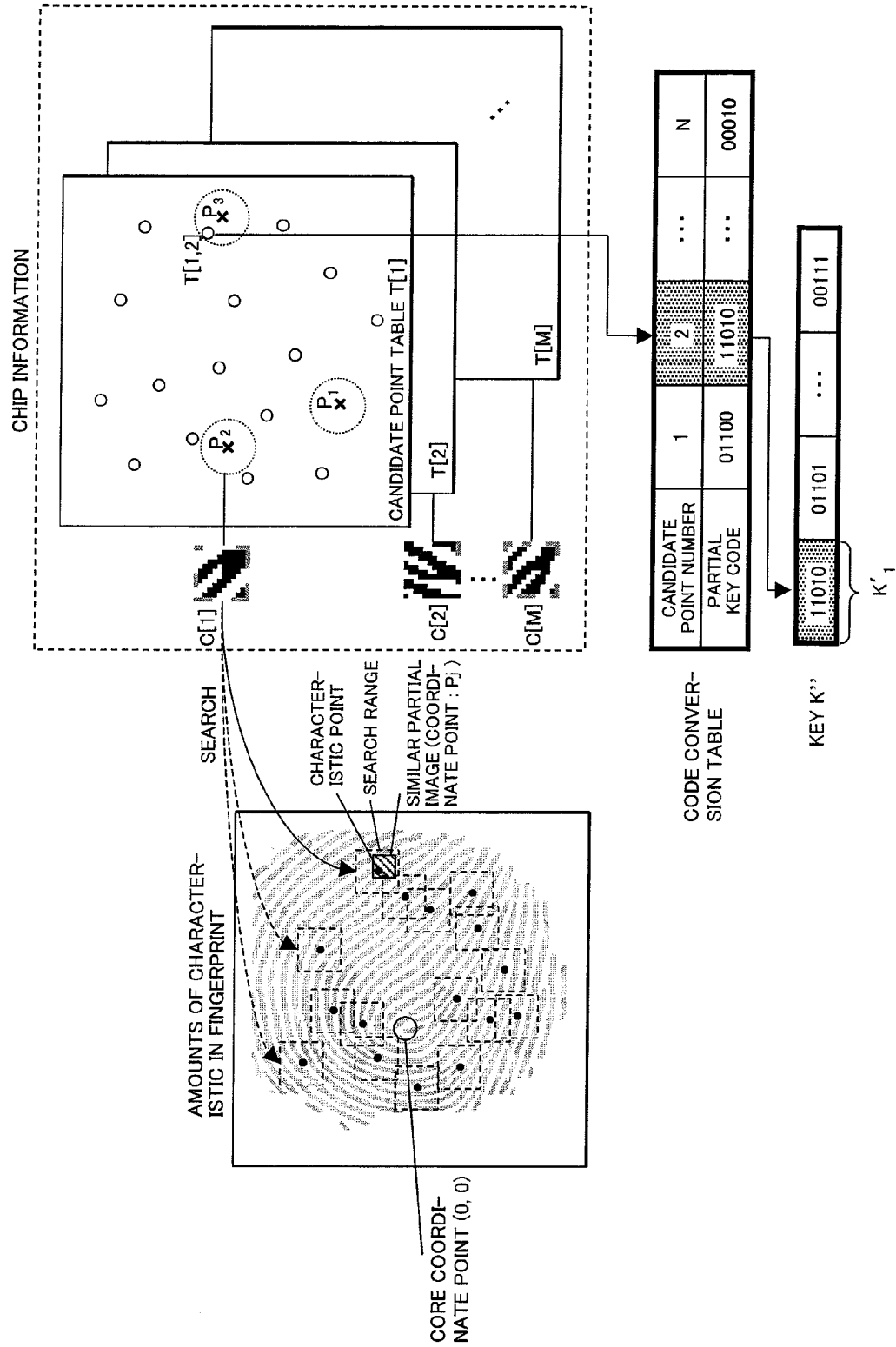
FIG. 15 is a view illustrating a step of extracting amounts of characteristic and restoring an encryption key for user authentication in the second embodiment.

FIG. 15 is a view illustrating the situation in which the operations for extracting amounts of characteristic and for restoring the secret key are performed for authentication in the second embodiment.

FIG. 17 is a view illustration a relation radiation available for label information in the second embodiment.

At first, the characteristic amounts extracting function 203 detects a core from a fingerprint image, and sets the position as an origin (0, 0) for a coordinate system (step 800). In the fingerprint image shown in FIG. 15, a position where a white circle (○) is present near the center of the image is a core. When there is not core at registration and one of the characteristic points is set as an origin and the chip image is included in the auxiliary information, a partial image most coincident with the chip image is searched from the fingerprint image, and the position obtained as a result of search is regarded as an origin.

The characteristic amounts extracting function 203 detects all of characteristic points from the fingerprint image (step 801). In the example shown in FIG. 15, the position of a black circle (●) is a characteristic point.

i is set to 1 (i=1) (step 802).

A partial image having the similarity to C[i] not smaller than a prespecified threshold value is searched for each of the detected characteristic points (step 804). In the example shown in FIG. 15, a region in which a partial image is searched for each characteristic point is shown with the square which is indicated by dotted lines. The similarity of an image, when a fingerprint image is expressed, for instance, as a binary image (monochrome image), can be computed as the number of points where the chip image and the partial image are coincident each other in color when overlaid on each other.

When a similar partial image is not found, the processing jumps to step 811 (step 805).

Positions of the similar partial images searched out as described above are arrayed in the descending order of the similarity as $P_1, P_2, \ldots$ (step 806). These positions are referred to as similar points.

K is set to 1 (K=1) (step 807).

Of the N pieces of candidate points for T[i], the candidate point closest to $P_k$ is set as T[i, j]. When a space between the $P_k$ and T [i, j] is away by a distance of a half of r or below, the processing jumps to step 812 (step 808). In the example shown in FIG. 15, there are three similar points ($P_1, P_2, P_3$) for C[i], which are expressed as x respectively. A radius of a dotted line circle around each $P_k$ as a center is an half of r. There is no candidate point within the circles around $P_1$ and $P_2$, but a candidate point T [1,2] is present within a circle around $P_3$. Therefore, when i is equal to 1 (i=1), j is set to 2 (j=2), the processing jumps to step 812. Because of the processing in step 516 shown in FIG. 11, the number of candidate points within the circle having a radium of ½ r is 1 at most.

Then K is incremented by 1 (K=K+1) (step 809).

When a similar point ($P_k$) not checked yet is present, the processing returns to step 808 (step 810).

When there is no similar point ($P_k$) not checked yet, or when it is determined in step 805 that there is no similar partial image, $K'_i$ is treated as unknown (step 811).

When a candidate point T[i, j] close to $P_k$ is found, partial key code corresponding to j is searched from the code conversion table 420 and set as $K'_i$ (step 812). In the example shown in FIG. 15, when i is equal to 1, j is equal to 2 (j=2), so that $K'_1$ is set to 11010 by referring to a position where a candidate point number is 2 in the code conversion table.

Then i is incremented by 1 (i=i+1) (step 813).

When i is not more than M, the processing returns to step 804 (step 814).

When the processing goes out of the loop, and all of $K'_i$ are decided, K" is set to $K'_1|K'_2| \ldots |K'_m$ (step 815). A|B is a combination of bit arrays for A and B coupled to each other.

Then the V" is employed as an exclusive OR of K" and ECC (step 816) as expressed by the Equation 3:

$$V''=K''(+)ECC \qquad \text{Equation 3}$$

Then the V" is decoded as RS code, and the obtained code is set as V' (step 817). Decoding of RS code can be performed at a high speed by using the BM (Berlekamp-Massey) algorithm.

As expressed by the equation 3 below, K' is set as an exclusive OR of V' and ECC (step 818).

$$K'=V'(+)ECC \qquad \text{Equation 4}$$

By executing error correction using the RS (M, M-2t) code, 2·E1+E2 is not larger than t wherein the number of i where $K_i$ is not equal to $K'_i$ (a dummy coordinate point is selected for C[i]) is E1 and the number of i where $K'_i$ is not known is E2, decoding is performed correctly and K'=K (a secret key at registration).

As described above, in this embodiment, by using a chip image of a characteristic point in a fingerprint as label information, arbitral numbers (orders) are allocated to a plurality of characteristic points, and the characteristic points again extracted from the fingerprint at authentication can be arrayed according to the order. With this operation, as compared to the technique disclosed in T. Charles Clancy, et al. "Secure Smartcard-Based Fingerprint Authentication" in which a number allocation cannot be performed, a length of a key can be made substantially longer.

Furthermore, in the technique disclosed in T. Charles Clancy, et al. "Secure Smartcard-Based Fingerprint Authentication", all of actual coordinate points for characteristic points and all dummy coordinate points are plotted on a plane and used as auxiliary information. When candidate points are close to each other, the following problems arise: stability in generation of a key drops; and when a dummy coordinate point is plotted at a position away by a certain distance or more from an actual coordinate point, a portion of the key information can be leaked from an arrangement of the candidate points. In contrast, in this embodiment, a discrete plane is set for each characteristic point (chip image), and one actual coordinate point and a plurality of dummy coordinates are plotted on each plane and are used as auxiliary information. Because of the feature, the auxiliary information can be configured so that the candidate points (actual coordinate points and dummy coordinate points) are positioned away from each other with a prespecified distance or more on a plane, which contributes to improvement of stability in generation of a key and also to prevention of leakage of key information based on arrangement of the candidate points.

Furthermore, because a dummy coordinate point is not plotted near a position where the candidate point erroneously coincides with corresponding chip images on each plane, even when similarity of a chip image becomes higher near an erroneously coincident point as compared to that near the actual coordinate point at restoration, guidance to the actual coordinate point can be performed, so that stability on key generation becomes higher. A discrete plane can be set for each characteristic point by using a chip image as label information for a characteristic point as label information and allocating an order number to the characteristic point.

Although a chip image is used as label information for a characteristic point in the embodiment described above, other information may be used as label information. For instance, label information may be prepared based on the number of ridges crossed by a string connecting two characteristic points in a fingerprint (relation). More specifically, as shown in FIG. 17, data $R[i]:\{(\phi[i][k], r[i][K])|K=1, 2, \ldots, n[i]\}$ ($n[i]$ is the number of characteristic points near $M[i]$) prepared by arraying, around a characteristic point $M[i]$, azimuth $\phi[i][K]$ near the $M[i]$ and relation $r[i][K]$ for the characteristic point for all characteristic points may be used as label information. In this case, when restoring the key, a characteristic point having a relation radiation coincident with $R[i]$ is searched from among the characteristic points extracted anew from the fingerprint image. Determination of coincidence between the relation radiations $R[i]$ and $R'[j]$ can be carried out by sorting $R[i]:\{(\phi[i][k], r[i][K])|K=1, 2, \ldots, n[i]\}$ and $R'[j]:\{(\phi'[j][l], r'[j][l])|l=1, 2, \ldots, n[j]\}$ for each of $\phi[i][k]$ and $\phi'[j][l]$, and setting the corresponding cost for $(\phi[i][k], r[i][K])$ or for $(\phi'[j][l], r'[j][l])$ to 0 when $r[i][K]=r'[j][l] \wedge |\phi[i][k]-\phi'[j][l]|<\phi max$, and to 1 in other cases (the $\phi max$ is a prespecified threshold value), and also by computing the corresponding costs for $R[i]$ and $R'[j]$ by means of the dynamic planning method. When the corresponding costs are below the prespecified threshold value, coincidence is accepted, and otherwise non-coincidence is recognized.

[Assessment of the Present Invention]

As understood from the descriptions of the embodiments of the present invention above, when biometrics characteristic information is expressed as a set of characteristic elements such as characteristic points in a fingerprint which can hardly be ordered, by using information for a portion of the characteristic elements as a label, ordering becomes possible, and a key having a large bit length can be generated in the stable condition.

More specifically, from multiple types of information included in a characteristic element such as a position, a direction, a type (an end point or a branched point) of a characteristic point, a chip image (a local partial image centering on the characteristic point), and relation (the number of ridges between the characteristic point and other characteristic points), two types of information each having high independency are selected (such as a position and a chip image), and one of the two types of information (for instance, the chip image) is recorded as a label (auxiliary information) for the characteristic point. At authentication, the key information is restored by re-arraying the characteristic points by referring to the label and also outputting other type of information (such as a position) in succession.

Comparison is made between an effective bit length of a key according to the present invention and that provided by the technique disclosed in T. Charles Clancy, et al. "Secure Smartcard-Based Fingerprint Authentication" while exemplifying generation and restoration of the key from a fingerprint. In the following descriptions, n denotes a number of actual characteristic points, N denotes a number of candidate characteristic points including false characteristic points generated for each of the actual characteristic points, and t denote the maximum capacity of erroneous characteristic points generated at authentication. When error correction with RS code is employed, an effective bit length of a key is assessed by the following equation (5).

$$(n-2t)\log(N) \qquad \text{(Equation 5)}$$

When it is assumed that N=64, n=20, and t=8, the effective bit length is 24 bits, and a bit length of the key generated according to the present invention is substantially longer than that (7 bits) of the key generated by the technique disclosed in T. Charles Clancy, et al. "Secure Smartcard-Based Fingerprint Authentication". A total number of keys generated in the present invention is 16,770,000, and in an authentication system in which retry is permitted up to 3 times, the possibility of erroneous authentication is about 0.000018%.

Furthermore, in the technique disclosed in the T. Charles Clancy, et al. "Secure Smartcard-Based Fingerprint Authentication", all of actual characteristic points and all of false characteristic points are plotted as candidate characteristic points on a plane, and a candidate characteristic point closest to a characteristic point in a fingerprint newly acquired at authentication is searched. In the present invention, a discrete plane is set for each of the actual characteristic points, and one actual characteristic point and a plurality of false characteristic points are plotted on each plane, and candidate characteristic points closest to the characteristic points in a fingerprint acquired anew at authentication are searched on the corresponding plane. In the technique disclosed in T. Charles Clancy, et al. "Secure Smartcard-Based n Fingerprint Authentication", an attacker can figure out a key space with the stability in key restoration lowered (the effective bit of the key is short) for the reasons as described above. In contrast, in the present invention, stability in key restoration is improved and figuring out of a key space by an attacked by the method as described above is impossible.

INDUSTRIAL APPLICABILITY OF THE PRESENT INVENTION

The present invention is applicable to any application requiring authentication of a user, and especially can improve the security and privacy at authentication via a network. For instance, the present invention can be applied to information access control in a private network in business organization, banking system through the Internet, personal confirmation in ATMs, management of logging in a Web site provided for specific members, personal authentication to enter protective areas, and logging in a personal computer.

Furthermore secret information can be encrypted by using a secret key generated by using biometrics information. For instance, a secret key using biometric information acquired from a user can be used for encryption when the user stores data including secret information in a server on an open network.

INCORPORATION

The content of Japanese application serial no. JP 2005-87808, filed on Mar. 25, 2005 is hereby incorporated by reference into this application.

What is claimed is:

1. A personal authentication system based on biometrics information using an encryption key, comprising:
   a client terminal having a fingerprint sensor and an IC card reader/writer; and an authentication server coupled via a communication channel to the client terminal;

wherein, at registration of personal information for authentication, the client terminal generates a public key and a secret key forming a pair with the public key, and registers the public key in the authentication server;

the client terminal reads a fingerprint image for registration of personal information for authentication with the fingerprint sensor, and extracts characteristic points in the fingerprint image;

the client terminal allocates characteristic point numbers to partial images of the characteristic points in the fingerprint image, respectively, for ordering, and sets coordinate values for each characteristic point as correct coordinate values, generates dummy coordinate values different from the correct coordinate values for each of the characteristic points, generates a candidate point record including the correct coordinate values and the dummy coordinate values for each of the characteristic point numbers, and orders the characteristic points in the candidate point record;

furthermore, the client terminal generates a characteristic point table including records, where each record comprises images of the characteristic points from the fingerprint and the candidate point record;

divides the secret key and generates a code conversion table in which numbers of the correct coordinate values in the candidate point record corresponding to the characteristic point number obtained by dividing the secret key and partial key code corresponding to a division order are associated with each other;

writes auxiliary information including the characteristic point table and the code conversion table in an IC card carried by a person to be authenticated with the IC card reader/writer;

furthermore in the stage of authentication, the client terminal reads the auxiliary information from the IC card with the IC card reader/writer;

reads a fingerprint image for authentication with the fingerprint sensor;

extracts characteristic points in the fingerprint image;

arrays the characteristic points in the fingerprint image for authentication, in the characteristic point table included in the auxiliary information according to a descending order or proximity to each characteristic point in the fingerprint image, determines whether a correct coordinate value for the candidate point record corresponding to an image of each characteristic point in the fingerprint is present with predetermined nearness to the characteristic point in the fingerprint image for authentication; obtains the partial key code corresponding to a number of the correct coordinate value in the candidate point record from the code conversion table and restores a portion of the secret key;

executes the same operations for all of the images of the characteristic points in the fingerprint stored in the characteristic point table to restore the secret key; and furthermore the client terminal receives data from the authentication server, the client terminal signs the data from the authentication server with the restored secret key and transmits the data to the authentication server, while the authentication server performs authentication by verifying the transmitted signature with the public key.

2. The personal authentication system using biometrics information according to claim 1, wherein the characteristic point table generates dummy images different from images of characteristic points in the fingerprint image for authentication, and adds the record comprising the dummy images and candidate point record including only the dummy coordinate values in the characteristic point table.

3. A method of selecting and outputting characteristics of an encryption key using biometrics information, said biometrics information including characteristic elements which each include a first characteristic value corresponding to a partial image for characteristic points and a second characteristic value having correspondence to a correct coordinate value for characteristic points:

wherein the method is implemented at least in part by a processor device and comprises, in the selecting and outputting characteristics of the encryption key:

receiving amounts of characteristics;

arraying characteristic elements included in said amounts of characteristics, and allocating characteristic point numbers to partial images of characteristic points;

selecting a sub-set of the characteristic elements;

generating plural false second characteristic values, each different from each said second characteristic value having the correct coordinate value;

generating candidate characteristic value sets including as candidate characteristic values, said false second characteristic values and also second characteristic values corresponding to the sub-set of characteristic elements and having correct coordinate values;

assigning an identifier to each candidate characteristic value of each candidate characteristic value set;

generating elements of auxiliary information which are pairs of each first characteristic value of said characteristic elements and each candidate characteristic value set;

outputting the elements of auxiliary information arrayed in order, as auxiliary information; and outputting identifiers arrayed in order, as information of the encryption key;

wherein the method comprises, in a stage of restoration of the encryption key:

receiving biometrics information for restoration and said auxiliary information;

selecting first characteristic values in said auxiliary information in order;

searching from said biometrics information for restoration, a characteristic element having a first characteristic value most resembling a first characteristic value in said auxiliary information, as a similar characteristic element; and selecting from candidate characteristic value sets, a candidate second characteristic value most resembling a second characteristic value in the similar characteristic element;

searching for an identifier assigned to the selected candidate second characteristic value in each candidate characteristic value set;

outputting information of arrayed identifiers searched in order, as information for restoration of the encryption key.

4. The method according to claim 3, wherein, in the selecting and outputting characteristics of the encryption key, false first characteristic values different from the first characteristic values of characteristic elements included in the biometrics information are generated, the candidate characteristic value set associated with the first characteristic values includes only false first characteristic values not including the second characteristic values having the correct coordinate values, and a set in which the false first characteristic values are associated with the candidate characteristic value set is added.

5. The method according to claim 4, wherein, in the generating the false second characteristic values different from said second characteristic values having the correct coordinate values for each characteristic element, the false second characteristic values generated have coordinate values spaced away from the correct coordinate values by a prespecified distance or more.

6. The method according to claim 4, wherein, in the selecting and outputting characteristics of the encryption key, in the generating the false second characteristic values different from said second characteristic values having the correct coordinate values for each characteristic element, a characteristic element having the first characteristic values similar to the characteristic element is used, and the false second characteristic values are generated to be spaced away by a specified distance or more, from the second characteristic values of the characteristic element similar to the former characteristic element.

7. The method according to claim 3, wherein, in the stage of restoration of the encryption key, in the selecting the candidate second characteristic value most resembling a second characteristic value in the similar characteristic element, a characteristic element in biometrics information for restoration of the encryption key to which the first characteristic values is most similar to is selected sequentially in relation to first characteristic values of each characteristic element in a characteristic element table in the auxiliary information, and a candidate as the correct coordinate values in the candidate characteristic values is set by determining whether the second characteristic value is within a prespecified distance from any characteristic values within the characteristic value set corresponding to the first characteristic values in the characteristic element.

8. The method according to claim 3, wherein, partial key information of the encryption key is divided by a number of samples of the characteristic elements included in the biometrics information as a reference.

9. The method according to claim 3, wherein, in the selecting and outputting characteristics of the encryption key, an error correction code is generated for the key information, and furthermore, the error correction code is included in the auxiliary information, and in the stage of restoration of the encryption key, an error in the information restored with the encryption key is corrected with the error correction code, and the corrected information is output.

* * * * *